(12) United States Patent
Lee

(10) Patent No.: US 10,831,652 B2
(45) Date of Patent: Nov. 10, 2020

(54) MEMORY SYSTEM AND OPERATING METHOD THEREOF

(71) Applicant: SK hynix Inc., Gyeonggi-do (KR)

(72) Inventor: Dong Sop Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 142 days.

(21) Appl. No.: 16/055,737

(22) Filed: Aug. 6, 2018

(65) Prior Publication Data

US 2019/0188127 A1    Jun. 20, 2019

(30) Foreign Application Priority Data

Dec. 20, 2017    (KR) .......................... 10-2017-0176578

(51) Int. Cl.
*G06F 12/02* (2006.01)
*G06F 12/0802* (2016.01)
*G06F 11/10* (2006.01)

(52) U.S. Cl.
CPC ...... *G06F 12/0246* (2013.01); *G06F 11/1048* (2013.01); *G06F 11/1068* (2013.01); *G06F 12/0292* (2013.01); *G06F 12/0802* (2013.01); *G06F 2212/401* (2013.01); *G06F 2212/7201* (2013.01); *G06F 2212/7203* (2013.01)

(58) Field of Classification Search
CPC ............. G06F 12/0246; G06F 12/0292; G06F 12/0802; G06F 11/1048; G06F 11/1068; G06F 2212/401; G06F 2212/7201; G06F 2212/7203
See application file for complete search history.

(56) References Cited

U.S. PATENT DOCUMENTS

| | | | | |
|---|---|---|---|---|
| 6,360,213 B1 * | 3/2002 | Wagstaff | ............... | G06F 16/284 |
| 9,946,462 B1 * | 4/2018 | Li | .......... | G06F 3/0608 |
| 2012/0284587 A1 * | 11/2012 | Yu | ......... | G06F 3/0608 |
| | | | | 714/773 |
| 2014/0281146 A1 * | 9/2014 | Horn | ...................... | G06F 3/064 |
| | | | | 711/103 |
| 2017/0024127 A1 * | 1/2017 | Bazarsky | ............... | G11C 29/52 |
| 2017/0139773 A1 | 5/2017 | Kang et al. | | |
| 2017/0177497 A1 | 6/2017 | Chun et al. | | |

* cited by examiner

*Primary Examiner* — Nanci N Wong
(74) *Attorney, Agent, or Firm* — IP & T Group LLP

(57) ABSTRACT

In a memory system and an operating method thereof, the method includes: receiving a read command and a read logical address; reading a raw map slice stored in a nonvolatile memory device, in a map read phase, in response to the read command, wherein the raw map slice includes a read physical address corresponding to the read logical address; generating a compressed map slice by compressing the raw map slice; storing a compression class corresponding to a ratio of a size of the compressed map slice to a size of the raw map slice in a compression class description table; storing the compressed map slice in a buffer memory; and reading data corresponding to the read command from the nonvolatile memory device, in a data read phase, based on the compressed map slice stored in the buffer memory.

20 Claims, 12 Drawing Sheets

FIG. 6

Compression Class Description Table

| Class Entry-1 | EntryBit Map_1 | Class Code ⟨1⟩ | Start LA ⟨1⟩ | | | | | |
| Class Entry-2 | EntryBit Map_2 | Class Code ⟨1⟩ | Start LA ⟨1⟩ | Class Code ⟨2⟩ | Start LA ⟨2⟩ | | | |
| Class Entry-3 | EntryBit Map_3 | Class Code ⟨1⟩ | Start LA ⟨1⟩ | Class Code ⟨2⟩ | Start LA ⟨2⟩ | ⋮ | Class Code ⟨8⟩ | Start LA ⟨8⟩ |
| Class Entry-4 | EntryBit Map_4 | Class Code ⟨1⟩ | Start LA ⟨1⟩ | Class Code ⟨2⟩ | Start LA ⟨2⟩ | Class Code ⟨3⟩ | Start LA ⟨3⟩ | Class Code ⟨4⟩ | Start LA ⟨4⟩ |

MEMORY SYSTEM AND OPERATING METHOD THEREOF

CROSS-REFERENCE TO RELATED APPLICATION

The present application claims priority under 35 U.S.C. § 119(a) to Korean patent application number 10-2017-0176578, filed on Dec. 20, 2017, which is herein incorporated by reference in its entirety.

BACKGROUND

1. Field of Invention

Various embodiments of the present disclosure generally relate to a memory system and an operating method thereof. Particularly, the embodiments relate to a memory system configured to generate compressed logical-to-physical address mapping information by compressing logical-to-physical address mapping information stored in a nonvolatile memory device, store the compressed logical-to-physical address mapping information in a buffer memory, and manage the compression class of the compressed logical-to-physical address mapping information, and an operating method of the memory system.

2. Description of the Related Art

A nonvolatile memory device may include a plurality of memory blocks. In addition, each memory block may include a plurality of memory cells, and an erase operation may be simultaneously performed on memory cells included in one memory block.

When a memory system receives a write command and a logical address, which are input from a host, the memory system may allocate a physical address corresponding to the logical address, and write data in a memory area corresponding to the physical address.

The memory system may temporarily store address mapping information in a buffer memory, and flush the address mapping information stored in the buffer memory to a nonvolatile memory device. Also, when the memory system is power on, the memory system may re-load address mapping information stored in the nonvolatile memory device to the buffer memory.

SUMMARY

Embodiments provide a memory system capable of generating compressed logical-to-physical address mapping information by compressing logical-to-physical address mapping information stored in a nonvolatile memory device, storing the compressed logical-to-physical address mapping information in a buffer memory, and managing the compression class of the compressed logical-to-physical address mapping information, and an operating method of the memory system.

According to an aspect of the present disclosure, there is provided a method for operating a memory system, the method including: receiving a read command and a read logical address; reading a raw map slice stored in a nonvolatile memory device, in a map read phase, in response to the read command, wherein the raw map slice includes a read physical address corresponding to the read logical address; generating a compressed map slice by compressing the raw map slice; storing a compression class corresponding to a ratio of a size of the compressed map slice to a size of the raw map slice in a compression class description table; storing the compressed map slice in a buffer memory; and reading data corresponding to the read command from the nonvolatile memory device, in a data read phase, based on the compressed map slice stored in the buffer memory.

According to an aspect of the present disclosure, there is provided a memory system including: a nonvolatile memory device configured to store a plurality of raw map slices including logical-to-physical address mapping information; and a memory controller including a memory buffer and a logical-to-physical address mapping information compressor, wherein the logical-to-physical address mapping information compressor is configured to generate compressed map slices by compressing the plurality of raw map slices read from the nonvolatile memory device, and the memory buffer is configured to store the compressed map slices and a compression class description table including information obtained by classifying compression rates of the respective compressed map slices.

According to an aspect of the present disclosure, there is provided a memory system including: a memory device configured to store pieces of logical-to-physical address mapping information; and a controller configured to: compress, in case of a cache miss of a first logical address for a first read operation, a first piece corresponding to the first logical address among the pieces stored in the memory device and cache the compressed first piece; control the memory device to perform the first read operation according to a physical address mapped to the first logical address in the first piece; decompress, in case of a cache hit of a second logical address for a second read operation, a compressed second piece corresponding to the second logical address among one or more compressed and cached pieces; and control the memory device to perform the second read operation according to a physical address mapped to the second logical address in the second piece, wherein the controller caches the compressed piece according to an available caching size and a compression rate of the compressed piece.

BRIEF DESCRIPTION OF THE DRAWINGS

Various embodiments will now be described in more detail hereinafter with reference to the accompanying drawings; however, elements and features of the present disclosure may be embodied in different forms and should not be construed as limited to the embodiments set forth herein. Rather, these embodiments are provided so that this disclosure is thorough and complete and fully conveys the scope of the embodiments to those skilled in the art.

In the drawings, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 6 is a diagram illustrating a compression class description table according to an embodiment of the present disclosure.

DETAILED DESCRIPTION

In the following detailed description, certain exemplary embodiments of the present disclosure have been shown and described, simply by way of illustration. As those skilled in the art would realize based on such description, the described embodiments may be modified in various different ways, all without departing from the spirit or scope of the present disclosure. Accordingly, the drawings and description are to be regarded as illustrative in nature and not restrictive. Moreover, it is noted that reference to "an embodiment" is not necessarily to only one embodiment, and different references to "an embodiment" are not necessarily to the same embodiment(s).

In the entire specification, when an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include one or more additional components, unless stated or the context requires otherwise.

The terminology used herein is for the purpose of describing particular embodiments only and is not intended to be limiting of the present invention.

As used herein, singular forms may include the plural forms as well and vice versa, unless the context clearly indicates otherwise.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

Hereinafter, the various embodiments of the present invention will be described in detail with reference to the attached drawings.

Figure 1:
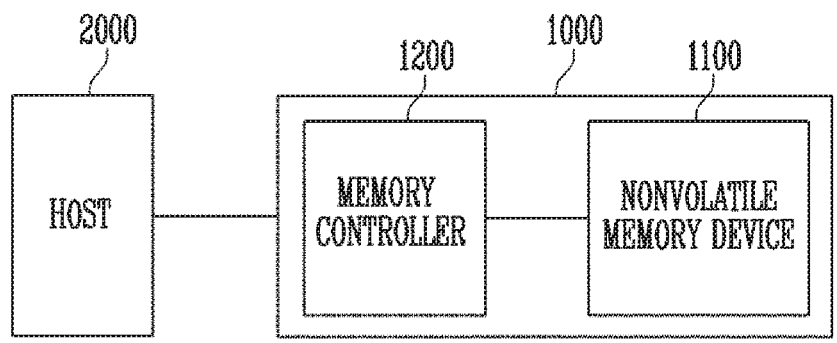
FIG. 1 is a diagram illustrating a memory system according to an embodiment of the present disclosure.

FIG. 1 is a diagram illustrating a memory system 1000 according to an embodiment of the present disclosure.

Referring to FIG. 1, the memory system 1000 may include a nonvolatile memory device 1100 that retains stored data even when power is cut off and a memory controller 1200 that controls the nonvolatile memory device 1100 under the control of a host 2000.

The host 2000 may communicate with the memory system 1000, using at least one of various communication protocols, such as a Universal Serial Bus (USB), a Serial AT Attachment (SATA), a High Speed InterChip (HSIC), a Small Computer System Interface (SCSI), Firewire, a Peripheral Component Interconnection (PCI), a PCI Express (PCIe), a NonVolatile Memory Express (NVMe), a Universal Flash Storage (UFS), a Secure Digital (SD), a MultiMedia card (MMC), an Embedded MMC (eMMC), a Dual In-line Memory Module (DIMM), a Registered DIMM (RDIMM), a Load Reduced DIMM (LRDIMM), and the like.

The memory controller 1200 may control overall operations of the memory system 1000, and control data exchange between the host 2000 and the nonvolatile memory device 1100. For example, the memory controller 1200 may program or read data by controlling the nonvolatile memory device 1100 in response to a request of the host 2000. Also, the memory controller 1200 may store information of main memory blocks and sub-memory blocks, which are included in the nonvolatile memory device 1100, and select the nonvolatile memory device 1100 such that a program operation is performed on a main memory block or a sub-memory block according to the amount of data loaded for the program operation. In some embodiments, the nonvolatile memory device 1100 may include a flash memory.

Figure 2:
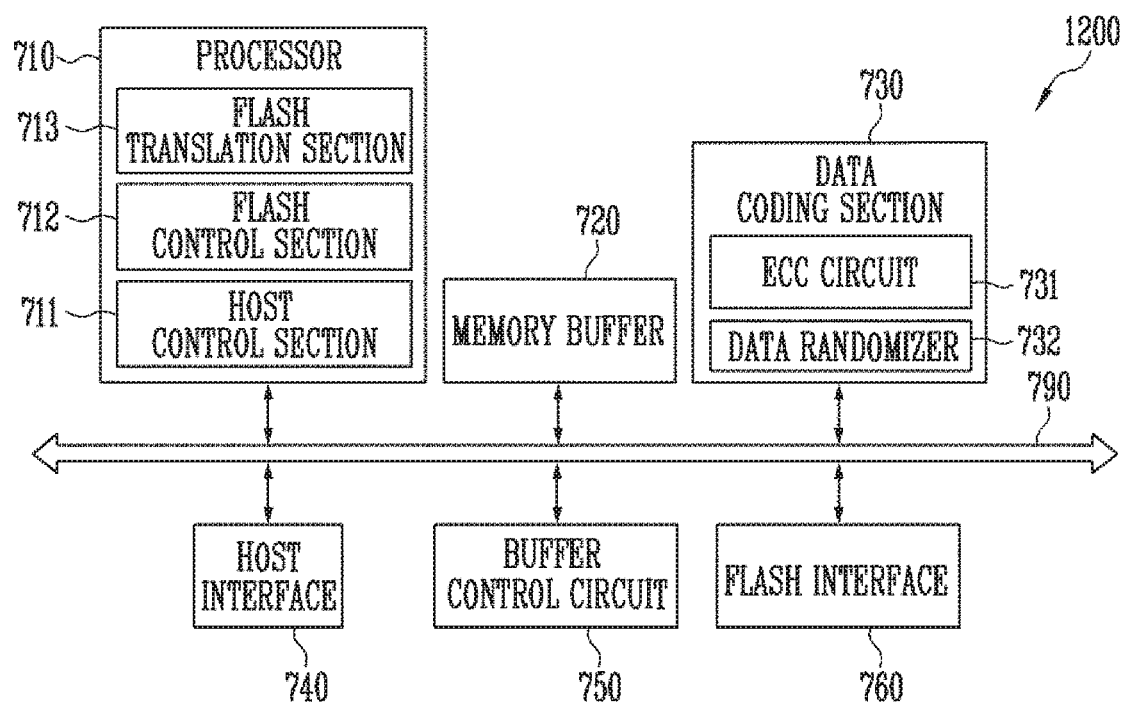
FIG. 2 is a diagram illustrating a memory controller of FIG. 1.

FIG. 2 is a diagram illustrating the memory controller 1200 of FIG. 1.

Referring to FIG. 2, the memory controller 1200 may include a processor 710, a memory buffer 720, a data coding section 730, a host interface 740, a buffer control circuit 750, a flash interface 760, and a bus 790. In addition, the data coding section 730 may include an error correction code (ECC) circuit 731 and a data randomizer 732.

The bus 790 may be configured to provide channels between components of the memory controller 1200.

The processor 710 may control overall operations of the memory controller 1200 and perform a logical operation. The processor 710 may communicate with the external host 2000 through the host interface 740 and communicate with the nonvolatile memory device 1100 through the flash interface 760. Also, the processor 710 may control the memory buffer 720 through the buffer control circuit 750. The processor 710 may be used as a working memory, a cache memory, or a buffer memory to control an operation of the memory system 1000.

The processor 710 may queue a plurality of commands input from the host 2000. Such an operation is referred to as a multi-queue. The processor 710 may sequentially transfer the plurality of queued commands to the nonvolatile memory device 1100.

The memory buffer 720 may be used as a working memory, cache memory, or a buffer memory of the processor 710. The memory buffer 720 may store codes and commands, which the processor 710 executes. The memory buffer 720 may store data processed by the processor 710. The memory buffer 720 may include a Static RAM (SRAM) or a Dynamic RAM (DRAM).

The ECC circuit 731 may perform error correction. The ECC circuit 731 may perform ECC encoding, based on data written in the nonvolatile memory device 1100 through the flash interface 760. The ECC-encoded data may be transferred to the nonvolatile memory device 1100 through the flash interface 760. The ECC circuit 731 may perform ECC decoding on data received through the flash interface 760 from the nonvolatile memory device 1100. As an example, the ECC circuit 731 may be included as a component of the flash interface 760 in the flash interface 760.

The host interface 740 may communicate with the external host 2000 under the control of the processor 710. The host interface 740 may communicate with the host 2000, using at least one of various communication protocols, such as a Universal Serial Bus (USB), a Serial AT Attachment (SATA), a High Speed InterChip (HSIC), a Small Computer System Interface (SCSI), Firewire, a Peripheral Component Interconnection (PCI), a PCI Express (PCIe), a NonVolatile Memory Express (NVMe), a Universal Flash Storage (UFS), a Secure Digital (SD), a MultiMedia card (MMC), an Embedded MMC (eMMC), a Dual In-line Memory Module (DIMM), a Registered DIMM (RDIMM), and a Load Reduced DIMM (LRDIMM).

The buffer control circuit 750 may control the memory buffer 720 under the control of the processor 710.

The flash interface 760 may communicate with the nonvolatile memory device 1100 under the control of the processor 710. The flash interface 760 may communicate a command, an address, and data with the nonvolatile memory device 1100 through a channel.

Although FIG. 2 shows that the memory controller 1200 includes the memory buffer 720 and the buffer control circuit 750, the present invention is not limited thereto. That is, the memory buffer 720 and/or the buffer control circuit 750 may be embodied separately or in another component, depending on an embodiment.

As an example, the processor 710 may control an operation of the memory controller 1200 using codes. The processor 710 may load codes from a nonvolatile memory device (e.g., a Read Only Memory (RAM)) provided in the memory controller 1200. As another example, the processor 710 may load codes from the nonvolatile memory device 1100 through the flash interface 760.

The data randomizer 732 may randomize data or de-randomize the randomized data. The data randomizer 732 may perform a data randomizing operation on data to be written in the nonvolatile memory device 1100 through the flash interface 760. The randomized data may be transferred to the nonvolatile memory device 1100 through the flash interface 760. The data randomizer 732 may perform a data de-randomizing operation on data received from the nonvolatile memory device 1100 through the flash interface 760. As an example, the data randomizer 732 may be included as a component of the flash interface 760 in the flash interface 760.

As an example, the bus 790 of the memory controller 1200 may be divided into a control bus and a data bus. The data bus may transmit data in the memory controller 1200, and the control bus may transmit control information such as a command and an address in the memory controller 1200. The data bus and the control bus are separated from each other so as not to interfere or influence with each other. The data bus may be coupled to the host interface 740, the buffer control circuit 750, the ECC circuit 731, and the flash interface 760. The control bus may be coupled to the host interface 740, the processor 710, the buffer control circuit 750, and the flash interface 760.

The memory system 1000 may receive a write command, write data, and a logical address from the host 2000. The processor 710 of the memory controller 1200 may allocate a physical storage area, i.e., a memory block (110 of FIG. 3) or page of the nonvolatile memory device 1100, in which the write data is to be stored, in response to the write command. In other words, the processor 710 may map a physical address corresponding to the logical address in response to the write command. The physical address may be an address corresponding to the physical storage area of the nonvolatile memory device 1100, in which the write data input from the host 2000 is to be stored.

The memory system 1000 may store, in a memory block (110 of FIG. 3) of the nonvolatile memory device 1100, mapping information between the logical address and the physical address, i.e., physical-to-logical address mapping information. The memory block (110 of FIG. 3) that stores the physical-to-logical address mapping information may be referred to as a system block.

As another example, when the memory system receives a write command, write data, and a logical address from the host 2000, the processor 710 of the memory controller 1200 may allocate a physical storage space of the nonvolatile memory device 1100, in which the write data is to be stored, in response to the write command. That is, the processor 710 may map a physical address corresponding to the logical address in the write command. Mapping information between a newly generated logical address and the physical address, i.e., physical-to-logical address mapping information may be stored in the memory buffer 720.

As another example, the memory system 1000 may receive a write command, write data, and a logical address from the host 2000. In addition, the memory buffer 720 of the memory controller 1200 may include information on a physical address to which the existing logical address is not mapped, i.e., information on a physical address corresponding to a free block or free page in the nonvolatile memory device 1100. The free block or free page may refer to a memory block (110 of FIG. 3) or page in which new data is to be written. In other words, the free block or free page may be in an erase state. In addition, the memory controller 1200 may buffer the write data input from the host 2000 to the memory buffer 720.

In this case, the processor 710 of the memory controller 1200 may check the information on the physical address corresponding to the free block or free page of the nonvolatile memory device 1100, which is stored in the memory buffer 720, in response to the write command received from the host 2000 and map the physical address to the logical address. Then, the memory controller 1200 may program the write data buffered to the memory buffer 720 in a storage space of the nonvolatile memory device 1100, which corresponds to the physical address. Mapping information between the logical address and the physical address, i.e., physical-to-logical address mapping information may be temporarily stored in the memory buffer 720 and then flushed to the memory block (110 of FIG. 3) of the nonvolatile memory device 1100.

The memory system 1000 may receive a read command and a logical address from the host 2000. The processor 710 of the memory controller 1200 may read logical-to-physical address mapping information corresponding to the logical address stored in the nonvolatile memory device 1100 in response to the read command and load the read logical-to-physical address mapping information to the memory buffer 720. Then, the processor 710 may check a physical address corresponding to the logical address from the logical-to-physical address mapping information loaded to the memory buffer 720, read data stored in a storage area of the nonvolatile memory device 1100, which corresponds to the physical address, and output the read data to the host 2000.

Whenever a read command and a logical address are received from the host 2000, the memory system 1000 may read logical-to-physical address mapping information corresponding to the logical address, which is stored in the nonvolatile memory device 1100 as described above, and load the read logical-to-physical address mapping information to the memory buffer 720. An operation of loading such logical-to-physical address mapping information may become a factor that degrades the read performance of the memory system 1000.

The memory system 1000 loads a larger amount of logical-to-physical address mapping information at a time as a memory space for storing logical-to-physical address mapping information in the memory buffer 720 becomes larger. As a result, through the operation of loading logical-to-physical address mapping information at one time, the logical-to-physical address mapping information can correspond to a plurality of read commands. Accordingly, the read performance of the memory system 1000 can be enhanced.

The memory system 1000 may manage logical-to-physical address mapping information used for a read operation and physical-to-logical address mapping information generated in a write operation as one integrated form. Alternatively, the memory system may separately manage the logical-to-physical address mapping information and the physical-to-logical address mapping information as different forms.

As an example, the logical-to-physical address mapping information may be optimized in searching for a physical address corresponding to a specific logical address. As a result, it is efficient to search for a physical address mapped to a logical address input from the host 2000 in a read operation.

As an example, the physical-to-logical address mapping information may be optimized for a write operation. When a write command, write data, and a logical address are received from the host 2000, it is necessary for the processor 710 of the memory controller 1200 to rapidly allocate a storage space of the nonvolatile memory device 1100, in which the write data is to be stored. To this end, the memory buffer 720 may store a list of physical addresses corresponding to storage space available for storing write data in the nonvolatile memory device 1100, and the processor 710 of the memory controller 1200. When a write command, write data, and a logical address are received from the host 2000, the processor 710 of the memory controller 1200 may map a physical address corresponding to a storage space capable of storing the write data to the logical address by searching for the list and then store the write data in a storage space corresponding to the physical address. The physical-to-logical address mapping information may be generated and temporarily stored in the memory buffer 720. Subsequently, the physical-to-logical address mapping information stored in the memory buffer 720 may be flushed to the nonvolatile memory device 1100.

In other words, logical-to-physical address mapping information for a read operation and physical-to-logical address mapping information generated or updated in a write operation may be separately managed in the memory buffer 720. Subsequently, after the physical-to-logical address mapping information stored in the memory buffer 720 is flushed to the nonvolatile memory device 1100, the logical-to-physical address mapping information and the physical-to-logical address mapping information may be integrated as one to be managed. As an example, the logical-to-physical address mapping information and the physical-to-logical address mapping information, which are separately managed in the memory buffer 720 may be integrated and managed in the form of logical-to-physical address mapping information.

The processor 710 may include a host control section 711, a flash control section 712, and a flash translation section 713.

The host control section 711 may control data transmission between the host 2000 and the host interface 740 and memory buffer 720. As an example, the host control section 711 may control an operation of buffering data input from the host 2000 to the memory buffer 720 via the host interface 740. As another example, the host control section 711 may control an operation of outputting data buffered to the memory buffer 720 to the host 2000 via the host interface 740.

The flash control section 712 may control an operation of transmitting data buffered in the memory buffer 720 in a write operation to the nonvolatile memory device 1100 and programming the data. As another example, the flash control section 712 may control an operation of buffering, to the memory buffer 720, data read and output from the nonvolatile memory device 1100 in a read operation.

The flash translation section 713 may map a physical address corresponding to a logical address input from the host 2000 in a data write operation. Also, the flash translation section 713 may transmit the mapped physical address to the flash control section 712, and the flash control section 712 may program data to the nonvolatile memory device 1100, based on the physical address. Also, the flash translation section 713 may generate physical-to-logical address mapping information and temporarily store the physical-to-logical address mapping information. Subsequently, the flash control section 712 may flush the physical-to-logical address mapping information temporarily stored in the memory buffer 720 to the nonvolatile memory device 1100.

The flash translation section 713 may read, from the nonvolatile memory device 1100, information on a physical address mapped to a logical address input from the host 2000 in a data read operation, i.e., logical-to-physical address mapping information, and store the logical-to-physical address mapping information in the memory buffer 720. The flash translation section 713 may check a physical address corresponding to the logical address from the logical-to-physical address mapping information stored in the memory buffer 720 and transmit the physical address to the flash control section 712. The flash control section 712 may read data from a storage space of the nonvolatile memory device 1100, which corresponds to the physical address.

Figure 3:
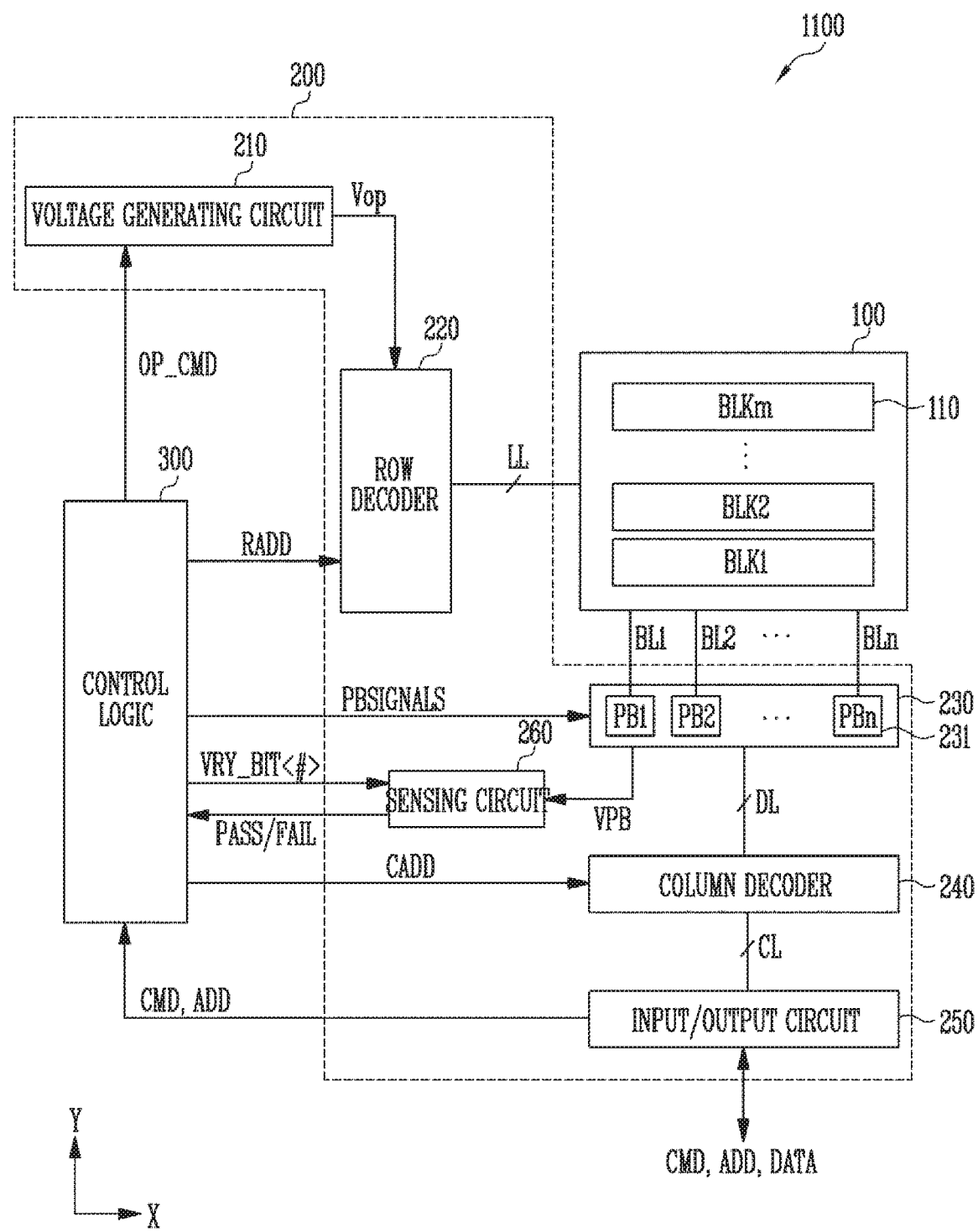
FIG. 3 is a diagram illustrating a nonvolatile memory device of FIG. 1.

FIG. 3 is a diagram illustrating the nonvolatile memory device 1100 of FIG. 1.

Referring to FIG. 3, the nonvolatile memory device 1110 may include a memory cell array 100 that stores data. The nonvolatile memory device 1110 may include peripheral circuits 200 that performs a program operation for storing data in the memory cell array 100, a read operation for outputting the stored data, and an erase operation for erasing the stored data. The nonvolatile memory device 1110 may include a control logic 300 that controls the peripheral circuits 200 under the control of the memory controller (1200 of FIG. 1).

The memory cell array 100 may include a plurality of memory blocks BLK1 to BLKm (m is a positive integer) 110. Local lines LL and bit lines BL1 to BLn (n is a positive integer) may be coupled to the memory blocks BLK1 to BLKm 110. For example, the local lines LL may include a first select line, a second select line, and a plurality of word lines arranged between the first and second select lines. Also, the local lines LL may further include dummy lines arranged between the first select line and the word lines and between the second select line and the word lines. Here, the first select line may be a source select line, and the second select line may be a drain select line. For example, the local lines LL may include word lines, drain and source select lines, and source lines SL. For example, the local lines LL may further include dummy lines. For example, the local lines LL may further include pipe lines. The local lines LL may be coupled to the memory blocks BLK1 to BLKm 110, respectively, and the bit lines BL1 to BLn may be commonly coupled to the memory blocks BLK1 to BLKm 110. The memory blocks BLK1 to BLKm 110 may be implemented in a two-dimensional or three-dimensional structure. For example, memory cells may be arranged in a direction parallel to a substrate in memory blocks BLK1 to BLKm 110 having a two-dimensional structure. For example, memory cells may be arranged in a direction vertical to a substrate in memory blocks BLK1 to BLKm 110 having a three-dimensional structure.

The peripheral circuits 200 may perform program, read, and erase operations of a selected memory block among the plurality of memory blocks BLK1 to BLKm 110 under the control of the control logic 300. For example, the peripheral circuits 200, under the control of the control logic 300, may supply verify and pass voltages to the first select line, the second select line, and the word lines, selectively discharge the first select line, the second select line, and the word lines, and verify memory cells coupled a selected word line among the word lines. For example, the peripheral circuits 200 may include a voltage generating circuit 210, a row decoder 220, a page buffer group 230, a column decoder 240, an input/output circuit 250, and a sensing circuit 260.

The voltage generating circuit 210 may generate various operating to voltages Vop used for program, read, and erase operations in response to an operation signal OP_CMD. Also, the voltage generating circuit 210 may selectively discharge the local lines LL in response to the operation signal OP_CMD. For example, the voltage generating circuit 210 may generate a program voltage, a verify voltage, pass voltages, a turn-on voltage, a read voltage, an erase voltage, a source line voltage, and the like under the control of the control logic 300.

The row decoder 220 may transfer the operating voltages Vop to local lines LL coupled to a selected memory block among the plurality of memory blocks BLK1 to BLKm 110 in response to a row address RADD.

The page buffer group 230 may include a plurality of page buffers PB1 to PBn 231 coupled to the bit lines BL1 to BLn. The page buffers PB1 to PBn 231 may operate in response to page buffer control signals PBSIGNALS. For example, the page buffers PB1 to PBn 231 may temporarily store data received through the bit lines BL1 to BLn, or sense voltages or current of the bit lines BL1 to BLn in a read or verify operation.

The column decoder 240 may transfer data between the input/output circuit 250 and the page buffer group 230 in response to a column address CADD. For example, the column decoder 240 may exchange data with the page buffers 231 through data lines DL, or exchange data with the input/output circuit 250 through column lines CL.

The input/output circuit 250 may transfer a command CMD and address ADD, which are received from the memory controller (1200 of FIG. 1), to the control logic 300, or exchange data DATA with the column decoder 240.

The sensing circuit 260, in a read operation and a verify operation, may generate a reference current in response to a permission bit VRY_BIT<#>, and output a pass signal PASS or a fail signal FAIL by comparing a sensing voltage VPB received from the page buffer group 230 with a reference voltage generated by the reference current.

The control logic 300 may control the peripheral circuits 200 by outputting the operation signal OP_CMD, the row address RADD, the page buffer control signals PBSIGNALS, and the permission bit VRY_BIT<#>, and the column address in response to the command CMD and the address ADD. Also, the control logic 300 may determine whether the verify operation has passed or failed in response to the pass or fail signal PASS or FAIL.

In an operation of the non-volatile memory device 1100, each memory block 110 may be a unit of an erase operation. In other words, a plurality of memory cells included in the memory block 110 are simultaneously erased, and may not be selectively erased.

Figure 4:
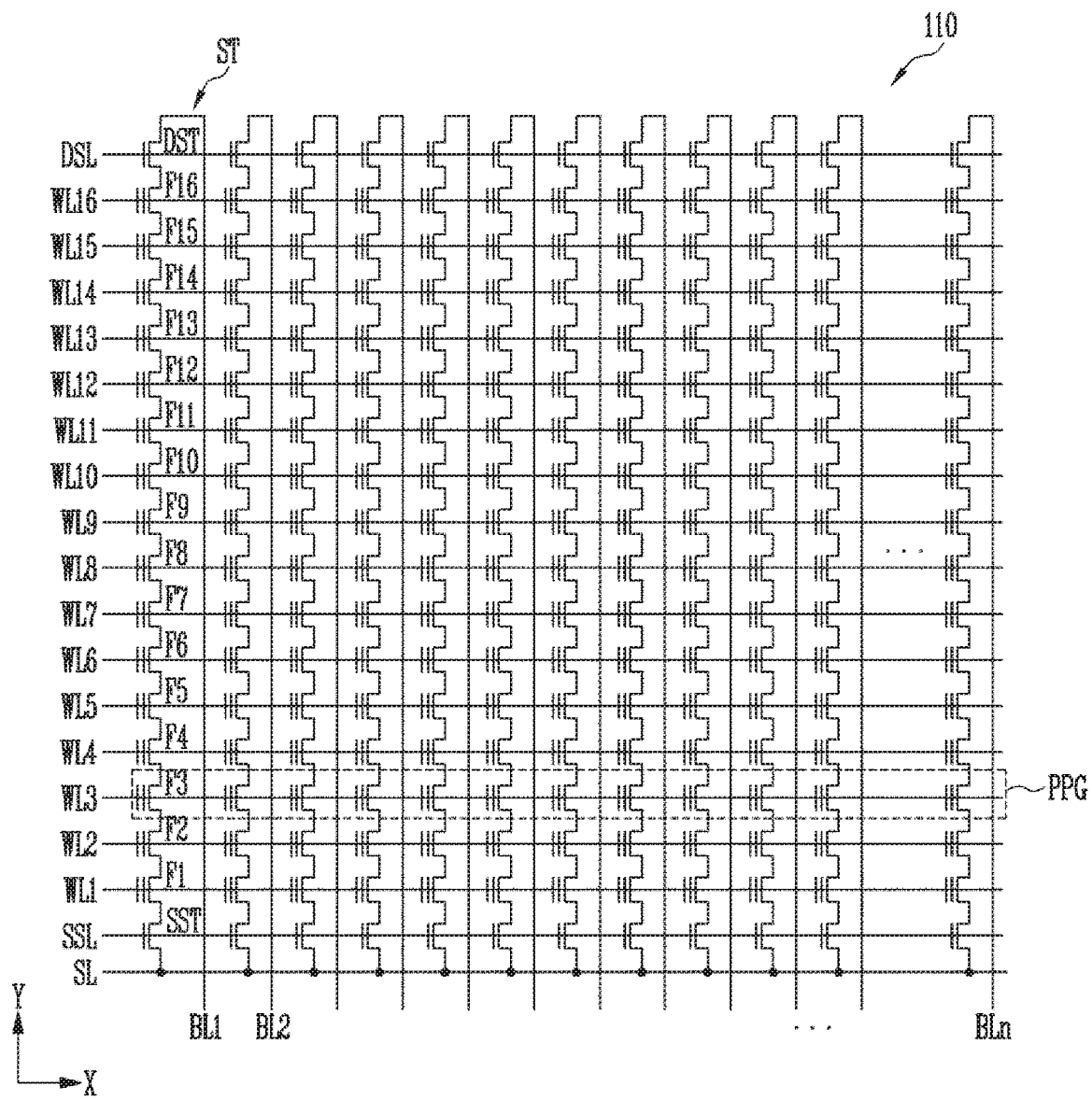
FIG. 4 is a diagram illustrating a memory block of FIG. 3.

FIG. 4 is a diagram illustrating an example of a memory block of FIG. 3. For example, the memory block 110 shown in FIG. 4 may correspond to any of the plurality of memory blocks BLK1 to BLKm shown in FIG. 3.

Referring to FIG. 4, a plurality of word lines arranged in parallel to one another between a first select line and a second select line may be coupled to the first memory block 110. Here, the first select line may be a source select line SSL, and the second select line may be a drain select line DSL. More specifically, the first memory block 110 may include a plurality of strings ST coupled between bit lines BL1 to BLn and a source line SL. The bit lines BL1 to BLn may be coupled to the strings ST, respectively, and the source line SL may be commonly coupled to the strings ST. The strings ST may be configured identically to one another, and therefore, a string ST coupled to a first bit line BL1 will be described in detail as an example.

The string ST may include a source select transistor SST, a plurality of memory cells F1 to F16, and a drain select transistor DST, which are coupled in series to each other between the source line SL and the first bit line BL1. At least one source select transistor SST and at least one drain select transistor DST may be included in one string ST, and memory cells of a larger number than that shown in FIG. 5 (i.e., more than the 16 memory cells, F1 to F16) may be included in one string ST.

A source of the source select transistor SST may be coupled to the source line SL, and a drain of the drain select transistor DST may be coupled to the first bit line BL1. The memory cells F1 to F16 may be coupled in series between the source select transistor SST and the drain select transistor DST. Gates of source select transistors SST in different strings ST may be coupled to the source select line SSL, gates of drain select transistors DST in different strings ST may be coupled to the drain select line DSL, gates of the memory cells F1 to F16 in different strings ST may be coupled to a plurality of word lines WL1 to WL16. A group of memory cells coupled to the same word line among the memory cells included in different strings ST may be a physical page PPG. Therefore, physical pages PPG of which number corresponds to that of the word lines WL1 to WL16 may be included in the first memory block 110.

One memory cell MC may store data of one bit. This is generally called as a single level cell (SLC). In this case, one physical page (PPG) may store one logical page (LPG) data. The one LPG data may include data bits of which number corresponds to that of cells included in one physical page PPG. In addition, one memory cell MC may store data of two or more bits. This is generally called as a multi-level cell (MLC). In this case, one physical page PPG may store two or more LPG data.

When the memory cell stores data of two bits, one physical page PPG may include two pages PG. One page PG may store one LPG data. One memory cell may have any one of a plurality of threshold voltages according to data, and a plurality of pages PG included in one physical page PPG may be expressed using a difference in threshold voltage.

A plurality of memory cells included in one physical page PPG may be simultaneously programmed. In other words, the nonvolatile memory device 1100 may perform a program operation in units of physical pages PPG. A plurality of memory cells included in one memory block may be simultaneously erased. In other words, the nonvolatile memory device 1100 may perform an erase operation in units of memory blocks 110. As an example, in order to update a portion of data stored in one memory block 110, after data required to be updated among the entire data is to modified by reading the entire data stored in the memory block 110, the entire data may be again programmed in another memory block 110.

Figure 5:
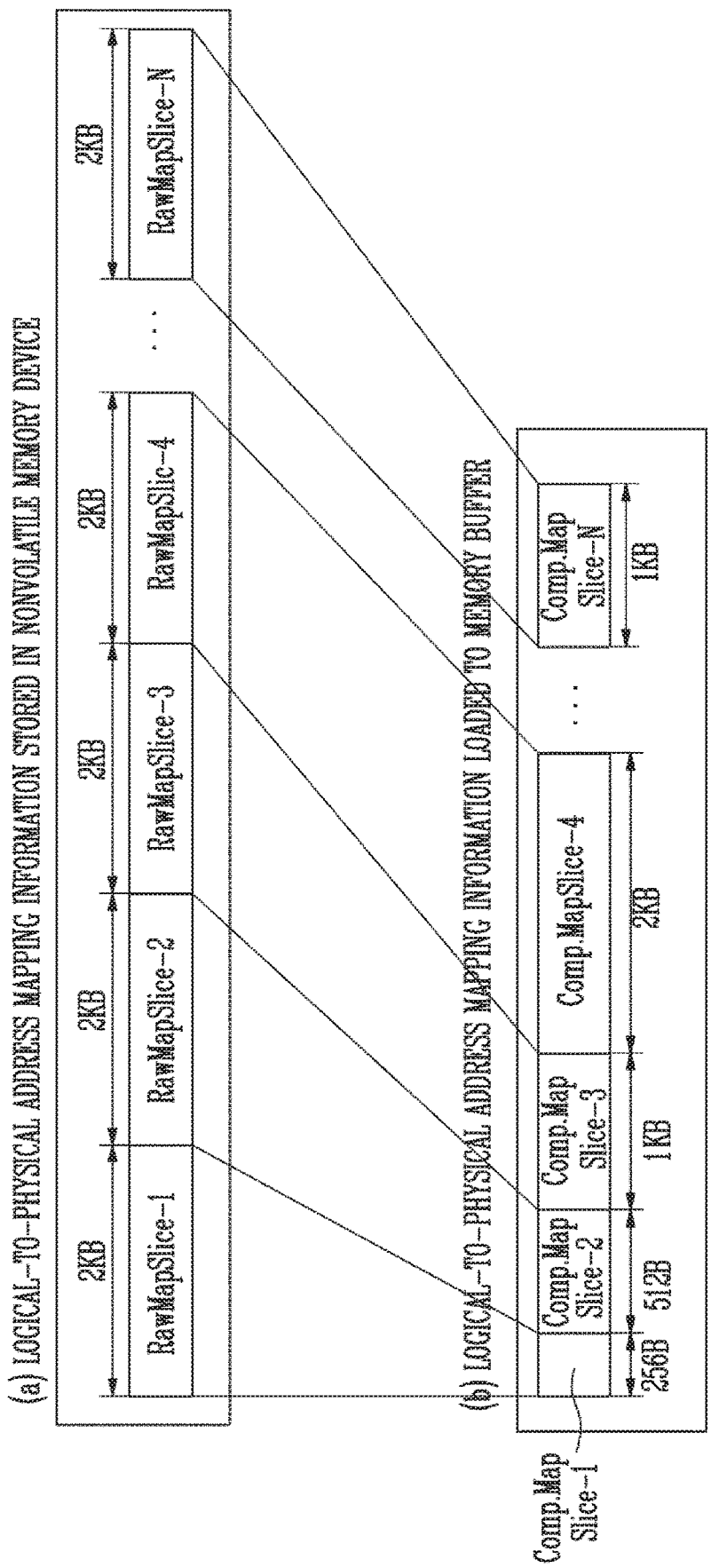
FIG. 5 is a diagram illustrating a method for compressing logical-to-physical address mapping information according to an embodiment of the present disclosure.

FIG. 5 is a diagram illustrating a method for compressing logical-to-physical address mapping information in accordance with an embodiment of the invention.

Referring to FIG. 5, the nonvolatile memory device 1100 may store logical-to-physical address mapping information. As an example, the logical-to-physical address mapping information may be divided into a plurality of raw map slices RawMapSlice to be managed. As an example, one raw map slice RawMapSlice may be data having a size of 2 kilobytes (2 KB).

When a read command and a logical address are received from the host 2000, the processor 710 of the memory controller 1200 may read the logical-to-physical address mapping information stored in the nonvolatile memory device 1100 and store the read logical-to-physical address mapping information in the memory buffer 720 so as to associate a physical address to the logical address. The memory controller 1200 may read the logical-to-physical address mapping information in units of the raw map slices RawMapSlice. In other words, the processor 710 may read only one raw map slice RawMapSlice from the nonvolatile memory device 1100, or read in parallel a plurality of raw map slices RawMapSlice.

As an example, the memory controller 1200 may receive a read command and a first logical address from the host 2000. The logical-to-physical address mapping information on the first logical address may be included in a first raw map slice RawMapSlice-1. In order to check a physical address corresponding to the first logical address, the processor 710 may read the first raw map slice RawMapSlice-1 including the logical-to-physical address mapping information on the first logical address from the nonvolatile memory device 1100 and store the read RawMapSlice-1 in the memory buffer 720. Then, the memory controller 1200 may check the physical address corresponding to the first logical address in the RawMapSlice-1 stored in the memory buffer 720, read data stored in a storage space of the nonvolatile memory device 1100, which corresponds to the physical address, and buffer the read data to the memory buffer 720. Then, the processor 710 of the memory controller 1200 may output the read data buffered to the memory buffer 720 to the host 2000 through the host interface 740.

Then, the memory controller 1200 may receive a read command and a second logical address. The logical-to-physical address mapping information on the second logical address may be included in a second raw map slice RawMapSlice-2. In order to check a physical address corresponding to the second logical address, the processor 710 may read the RawMapSlice-2 including the logical-to-physical address mapping information on the second logical address and store the read RawMapSlice-2 in the memory buffer 720. Then, the memory controller 1200 may check the physical address corresponding to the second logical address in the RawMapSlice-2 stored in the memory buffer 720, read data stored in a storage space of the nonvolatile memory device 1100, which corresponds to the physical address, and buffer the read data to the memory buffer 720. Then, the memory controller 1200 may output the read data buffered to the memory buffer 720 to the host 2000.

Then, the memory controller 1200 may receive a read command and a third logical address from the host 2000. Address mapping information on the third logical address may be included in a third raw map slice RawMapSlice-3. In order to check a physical address corresponding to the third logical address, the memory controller 1200 may read the RawMapSlice-3 including the address mapping information on the third logical address and store the read RawMapSlice-3 in the memory buffer 720.

As an example, when the memory buffer 720 allocates a memory space of 4 KB to store logical-to-physical address mapping information, the RawMapSlice-3 read from the nonvolatile memory device 1100 may be over-written in the space in which the RawMapSlice-1 or the RawMapSlice-2 is stored. Alternatively, the RawMapSlice-3 may be stored in a memory space obtained by deleting one of the RawMapSlice-1 and the RawMapSlice-2.

As another example, when the memory buffer 720 allocates a memory space of 8 KB to store logical-to-physical address mapping information, the memory controller 1200 does not delete the first and second raw map slices RawMapSlice-1 and RawMapSlice-2 stored in the memory buffer 720 but may add the third raw map slice RawMapSlice-3 in the memory buffer 720. Subsequently, the memory controller 1200 may complete a read operation corresponding to a read command, based on the RawMapSlice-3 stored in the memory buffer 720.

Then, the memory controller 1200 may receive a read command and a fourth logical address from the host 2000. Address mapping information on the fourth logical address may be included in the RawMapSlice-1. When the memory buffer 720 allocates the memory space of 4 KB to store the logical-to-physical address mapping information in the example described above, the RawMapSlice-1 may not be stored in the memory buffer 720. In this case, the memory controller 1200 may re-read the RawMapSlice-1 from the nonvolatile memory device 1100 and store the re-read RawMapSlice-1 in the memory buffer 720.

When the memory buffer 720 allocates the memory space of 8 KB to store the logical-to-physical address mapping information in the example described above, the RawMapSlice-1 may be still stored in the memory buffer 720. In this case, the memory controller 1200 may not re-read the RawMapSlice-1 from the nonvolatile memory device 1100. In this case, the memory controller 1200 may have excellent read performance as compared with when the RawMapSlice-1 is re-read from the nonvolatile memory device 1100.

When the memory buffer 720 allocates a large memory space to store logical-to-physical address mapping information as described above, an operation of reading logical-to-physical information from the nonvolatile memory device 1100 can be performed less than when the memory buffer 720 allocates a small memory space. As a result, the read performance of the memory system 1000 can be much better. However, since the size of a memory space that the memory buffer 720 can allocate to store logical-to-physical address mapping information is limited, a technique for overcoming this problem may be required.

The memory controller 1200 may decrease the size of logical-to-physical address mapping information by compressing such information before it is read from the nonvolatile memory device 1100 and then stored in the memory buffer 720. Data compression rates may be different depending on data characteristics of the raw map slices RawMapSlice. As an example, the memory controller 120 may apply various data compression rates when the raw map slices RawMapSlice are compressed and manage and sort the various data compression rates into a plurality of classes.

As an example, the RawMapSlice-1 may be compressed to 256 bytes (256 B) or less, thereby generating a first compressed map slice Comp.MapSlice-1. When the size of a compressed map slice Comp.MapSlice is larger than 0 B and equal to or smaller than 256 B, the memory controller 1200 may designate the compressed map slice Comp.MapSlice with a first compression class CompressionClass-1 and manage the compressed map slice Comp.MapSlice. In other words, the memory buffer 720 may allocate a memory space of 256 B to the compressed map slice Comp.MapSlice compressed to the CompressionClass-1.

Also, as an example, the RawMapSlice-2 may be compressed to a size exceeding 256 B and less than or equal to 512 bytes (512 B), thereby generating a second compressed map slice Comp.MapSlice-2. When the size of a compressed map slice Comp.MapSlice is greater than 256 B and less than or equal to 512 B, the memory controller 1200 may designate the compressed map slice Comp.MapSlice with a second compression class CompressionClass-2 and manage the compressed map slice Comp.MapSlice. In other words, the memory buffer 720 may allocate a memory space of 512 B to the compressed map slice Comp.MapSlice compressed to the second compression class CompressionClass-2.

Also, as an example, the RawMapSlice-3 may be compressed to a size exceeding 512 B and less than or equal to 1 kilobyte (1 KB), thereby generating a third compressed map slice Comp.MapSlice-3. When the size of a compressed map slice Comp.MapSlice is greater than 512 B and less than or equal to 1 KB, the memory controller 1200 may designate the compressed map slice Comp.MapSlice with a third compression class CompressionClass-3 and manage the compressed map slice Comp.MapSlice. In other words, the memory buffer 720 may allocate a memory space of 1 KB to the compressed map slice Comp.MapSlice compressed to the third compression class CompressionClass-3.

Also, as an example, a fourth raw map slice RawMapSlice-4 may be compressed to a size exceeding 1 KB and less than or equal to 2 kilobytes (2 KB), thereby generating a fourth compressed map slice Comp.MapSlice-4. When the size of a compressed map slice Comp.MapSlice is greater than 1 KB and less than or equal to 2 KB, the memory controller 1200 may designate the compressed map slice Comp.MapSlice with a fourth compression class CompressionClass-4 and manage the compressed map slice Comp.MapSlice. In other words, the memory buffer 720 may allocate a memory space of 2 KB to the compressed map slice Comp.MapSlice compressed to the fourth compression class CompressionClass-4.

As described above, the memory buffer 720 may allocate a memory space according to the compression class of a compressed map slice Comp.MapSlice to store the compressed map slice Comp.MapSlice.

As an example, when the memory buffer 720 allocates a memory space of a total of 2 KB to store logical-to-physical address mapping information, the memory buffer 720 may store eight compressed map slices Comp.MapSlice of CompressionClass-1. As another example, when the memory buffer 720 allocates a memory space of a total of 2 KB to store logical-to-physical address mapping information, the memory buffer 720 may store two compressed map slices Comp.MapSlice of CompressionClass-1, one compressed map slice Comp.MapSlice of CompressionClass-2, and one compressed map slice Comp.MapSlice of CompressionClass-3.

Figure 7:
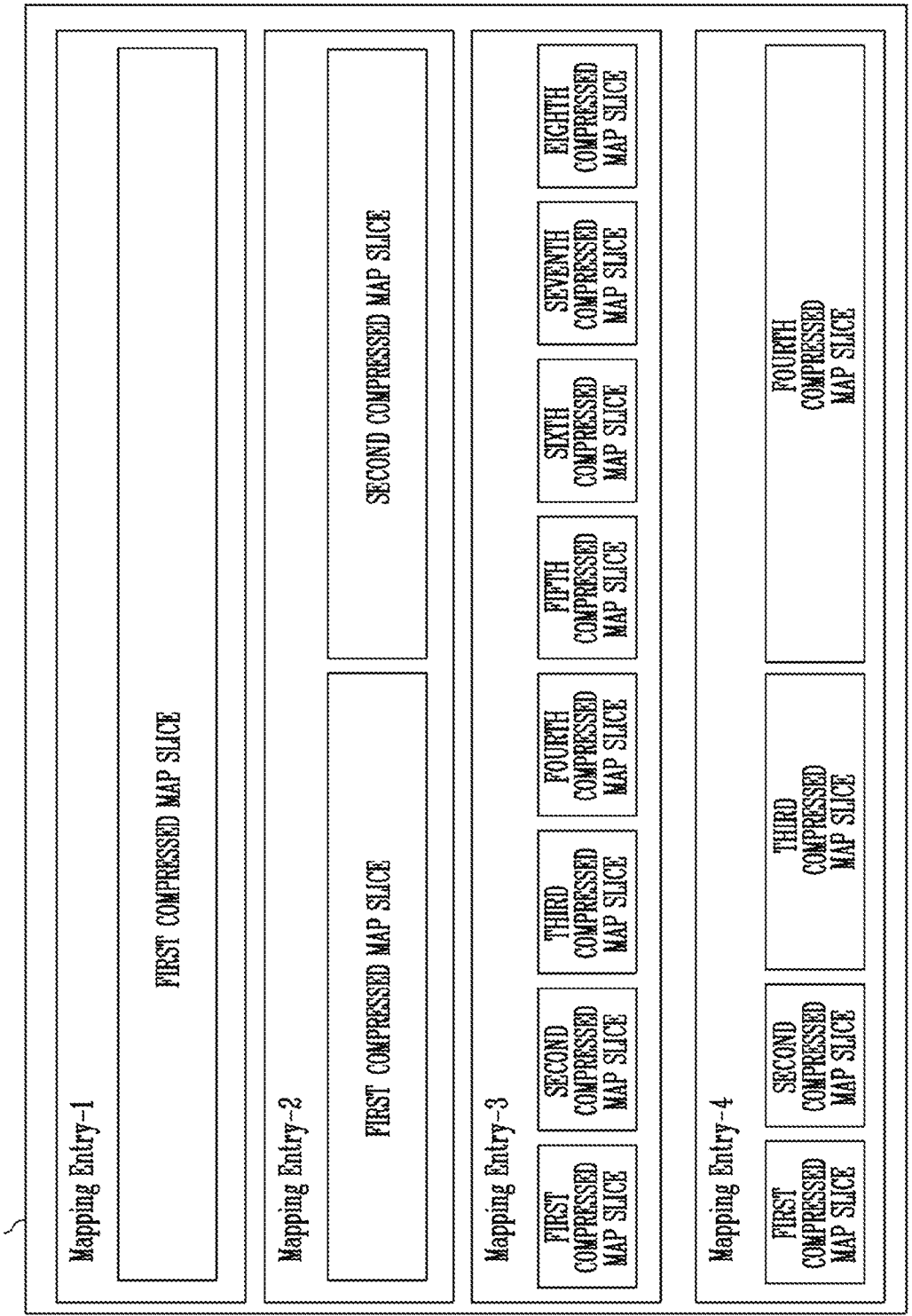
FIG. 7 is a diagram illustrating mapping entries for storing compressed map slices according to an embodiment of the present disclosure.

FIG. 6 is a diagram illustrating a compression class description table in accordance with an embodiment of the invention. FIG. 7 is a diagram illustrating mapping entries for storing compressed map slices Comp.MapSlice in accordance with an embodiment of the invention.

Referring to FIGS. 6 and 7, the processor 710 of the memory controller 1200 may store the compression class description table in the memory buffer 720 and manage the compression class description table.

As an example, the memory buffer 720 may allocate a memory space of 8 KB to store logical-to-physical address mapping information. The memory buffer 720 may divide and manage the memory space of 8 KB in units of 2 KB. Here, each memory space of 2 KB may be referred to as a mapping entry. When one raw map slice RawMapSlice has a size of 2 KB in the example described with reference to FIG. 5, eight compressed map slices Comp.MapSlice of the first compression class CompressionClass-1 may be stored in a single mapping entry of the buffer memory 720. Alternatively, two compressed map slices Comp.MapSlice of the first compression class CompressionClass-1, one compressed map slice Comp.MapSlice of the second compression class CompressionClass-2, and one compressed map slice Comp.MapSlice of the third compression class CompressionClass-3 may be stored in the mapping entry of the buffer memory 720. In addition, one compressed map slice Comp.MapSlice of the fourth compression class CompressionClass-4 may be stored in the mapping entry of the buffer memory 720.

As an example, the memory buffer 720 may include a memory space of 8 KB, i.e., first to fourth mapping entries Mapping to Entry_1 to Mapping Entry_4 to store compressed map slices Comp.MapSlice. That is, each of the first to fourth mapping entries Mapping Entry_1 to Mapping Entry_4 may have a memory space of 2 KB. The memory controller 1200 may generate and manage a compression class description table to manage the first to fourth mapping entries Mapping Entry_1 to Mapping Entry_4. As an example, the compression class description table may include first to fourth class entries Class Entry 1 to Class Entry 4, and each class entry may include information on any one of the first to fourth mapping entries Mapping Entry_1 to Mapping Entry_4 allocated to store compressed map slices Comp.MapSlice in the memory buffer 720.

As an example, a raw map slice RawMapSlice having a size of 2 KB, which is stored in the nonvolatile memory device 1100, may be compressed to the fourth compression class CompressionClass-4 to be stored in the first mapping entry Mapping Entry_1 of the memory buffer 720. In other words, a compressed map slice Comp.MapSlice compressed to the fourth compression class CompressionClass-4 may be stored in the first mapping entry Mapping Entry_1 that is a first memory space of 2 KB in the memory space of 8 KB, which is allocated in the memory buffer 720.

In this case, the memory controller 1200 may generate a first class entry Class Entry_1 in the compression class description table. In other words, the first class entry Class Entry_1 may store information on a first memory space of 2 KB, i.e., the first mapping entry Mapping Entry_1, which is allocated to store the compressed map slice Comp.MapSlice in the memory buffer 720. The first class entry Class Entry_1 may include a first entry bit map EntryBitMap_1, and a first class code Class Code<1> and a first start logical address StartLA<1> for the compressed map slice Comp.MapSlice compressed to the fourth compression class CompressionClass-4 and to be stored in the first mapping entry Mapping Entry_1.

That is, the first entry bit map EntryBitMap_1 may be information indicating that one compressed map slice Comp.MapSlice compressed to the fourth compression class CompressionClass-4 is stored in the first mapping entry Mapping Entry_1. The first class code Class Code<1> of the first class entry Class Entry-1 may be information indicating that the compression class CompressionClass of the compressed map slice Comp.MapSlice stored in the first mapping entry Mapping Entry-1 is the fourth compression class CompressionClass-4. In addition, the first start logical address StartLA<1> of the first class entry Class Entry-1 may include a start logical address included in logical-to-physical address mapping information of the compressed map slice Comp.MapSlice compressed to the fourth compression class CompressionClass-4.

As another example, two raw map slices RawMapSlice each having a size of 2 KB, which are stored in the nonvolatile memory device 1100, may be compressed to the third compression class CompressionClass-3 to be stored in the second mapping entry Mapping Entry_2 of the buffer memory 720. In other words, two compressed map slices Comp.MapSlice compressed to the third compression class CompressionClass-3 may be stored in the second mapping entry Mapping Entry_2 that is a second memory space of 2 KB in the memory space of 8 KB, which is allocated in the memory buffer 720.

In this case, the memory controller 1200 may generate a second class entry Class Entry-2 in the compression class description table. In other words, the second class entry Class Entry-2 may store information on a second memory space of 2 KB, i.e., the second mapping entry Mapping Entry_2, which is allocated to store a compressed map slice Comp.MapSlice in the memory buffer 720. The second class entry Class Entry-2 may include a second entry bit map EntryBitMap_2, a first class code Class Code<1> and a first start logical address StartLA<1> for a first compressed map slice compressed to the third compression class CompressionClass-3 and to be stored in the second mapping entry Mapping Entry_2, and a second class code Class Code<2> and a second start logical address StartLA<2> for a second compressed map slice compressed to the third compression class CompressionClass-3 and to be stored in the second mapping entry Mapping Entry_2.

That is, the second entry bit map EntryBitMap_2 may be information indicating that two compressed map slices Comp.MapSlice compressed to the third compression class CompressionClass-3 are stored in the second mapping entry Mapping Entry_2. In addition, the first class code Class Code<1> of the second class entry Class Entry-2 may be information indicating that the compression class CompressionClass of the first compressed map slice stored in the second mapping entry Mapping Entry_2 is the third compression class CompressionClass-3 and the second class code Class Code<2> of the second class entry Class Entry-2 may be information indicating that the compression class CompressionClass of the second compressed map slice stored in the second mapping entry Mapping Entry_2 is the third compression class CompressionClass-3. In addition, the first start logical address StartLA<1> of the second class entry Class Entry-2 may include a start logical address included in logical-to-physical address mapping information of the first compressed map slice compressed to the third compression class CompressionClass-3, which is stored in the second mapping entry Mapping Entry_2, and the second start logical address StartLA<2> of the second class entry Class Entry-2 may include start logical address included in logical-to-physical address mapping information of the second compressed map slice compressed to the third compression class CompressionClass-3, which is stored in the second mapping entry Mapping Entry_2.

As another example, eight raw map slices RawMapSlice each having a size of 2 KB, which are stored in the nonvolatile memory device 1100, may be compressed to the first compression class CompressionClass-1 to be stored in the third mapping entry Mapping Entry_3 of the memory buffer 720. In other words, eight compressed map slices Comp.MapSlice compressed to the first compression class CompressionClass-1 may be stored in a third memory space of 2 KB, i.e., the third mapping entry Mapping Entry_3 in the memory space of 8 KB, which is allocated to the buffer memory 720.

In this case, the memory controller 1200 may generate a third class entry Class Entry-3 in the compression class description table. In other words, the third class entry Class Entry-3 may store information on a third memory space of 2 KB, i.e., the third mapping entry Mapping Entry_3, which is allocated to store the compressed map slices Comp.MapSlice in the memory buffer 720. The third class entry Class Entry-3 may include a third entry bit map EntryBitMap_3, and first to eighth class codes Class Code<1> to Class Code<8> and first to eighth start logical addresses StartLA<1> to StartLA<8> for the eight compressed map slices Comp.MapSlice compressed to the first compression class CompressionClass-1 and to be stored in the third mapping entry Mapping Entry_3.

That is, the third entry bit map EntryBitMap_3 may be information indicating that eight compressed map slices Comp.MapSlice compressed to the first compression class CompressionClass-1 are stored in the third mapping entry Mapping Entry_3. In addition, each of the first to eighth class codes Class Code<1> to Class Code<8> of the third class entry Class Entry-3 may be information indicating that the compression class CompressionClass of each of the first to eighth compressed map slices Comp.MapSlice stored in the third mapping entry Mapping Entry_3 is the first compression class CompressionClass-1. In addition, the first to eighth start logical addresses StartLA<1> to StartLA<8> of the third class entry Class Entry-3 may include start logical addresses included in logical-to-physical address mapping information of the respective eight compressed map slices Comp.MapSlice compressed to the first compression class CompressionClass-1, which are stored in the third mapping entry Mapping Entry_3.

As another example, among four raw map slices RawMapSlice each having a size of 2 KB, which are stored in the nonvolatile memory device 1100, two raw map slices RawMapSlice compressed to the first compression class CompressionClass-1, one raw map slice RawMapSlice compressed to the third compression class CompressionClass-3, and remaining raw map slice RawMapSlice compressed to the fourth compression class CompressionClass-4 may be stored in the fourth mapping entry Mapping Entry_4. In other words, two compressed map slices Comp.MapSlice compressed to the first compression class CompressionClass-1, one compressed map slice Comp.MapSlice compressed to the third compression class CompressionClass-3, and one compressed map slice Comp.MapSlice compressed to the fourth compression class CompressionClass-4 may be stored in the fourth mapping entry Mapping Entry_4 that is a fourth memory space of 2 KB in the memory space of 8 KB, which is allocated to the memory buffer 720.

In this case, the memory controller 1200 may generate a fourth class entry Class Entry-4 in the compression class description table. In other words, the fourth class entry Class Entry-4 may store information on a fourth memory space of 2 KB, i.e., the fourth mapping entry Mapping Entry_4, which is allocated to store a compressed map slice Comp.MapSlice in the memory buffer 720. The fourth class entry Class Entry-4 may include a fourth entry bit map EntryBitMap_4, a first class code Class Code<1> and a first start logical address StartLA<1> for a first compressed map slice compressed to the first compression class CompressionClass-1 and to be stored in the fourth mapping entry Mapping Entry_4, a second class code Class Code<2> and a second start logical address StartLA<2> for a second compressed map slice compressed to the first compression class CompressionClass-1 and to be stored in the fourth mapping entry Mapping Entry_4, a third class code Class Code<3> and a third start logical address StartLA<3> for a third compressed map slice compressed to the third compression class CompressionClass-3 and to be stored in the fourth mapping entry Mapping Entry_4, and a fourth class code Class Code<4> and a fourth start logical address StartLA<4> for a fourth compressed map slice compressed to the fourth compression class CompressionClass-4 and to be stored in the fourth mapping entry Mapping Entry_4.

That is, the fourth entry bit map EntryBitMap_4 may be information indicating that two compressed map slices Comp.MapSlice compressed to the first compression class CompressionClass-1, one compressed map slice Comp.MapSlice compressed to the third compression class CompressionClass-3, and one compressed map slice Comp.MapSlice compressed to the fourth compression class CompressionClass-4 are stored in the fourth mapping entry Mapping Entry_4. Also, the fourth entry bit map EntryBitMap_4 may further include information on an order in which the four compressed map slices Comp.MapSlice are stored.

The first class code Class Code<1> of the fourth class entry Class Entry-4 may be information indicating that the compression class CompressionClass of the first compressed map slice is the first compression class CompressionClass-1, and the first start logical address StartLA<1> of the fourth class entry Class Entry-4 may include start logical address included in logical-to-physical address mapping information of the first compressed map slice compressed to the first compression class CompressionClass-1. In addition, the second class code Class Code<2> of the fourth class entry Class Entry-4 may be information indicating that the compression class CompressionClass of the second compressed map slice is the first compression class CompressionClass-1, and the second start logical address StartLA<2> of the fourth class entry Class Entry-4 may include start logical address included in logical-to-physical address mapping information of the second compressed map slice compressed to the first compression class CompressionClass-1.

The third class code Class Code<3> of the fourth class entry Class Entry-4 may be information indicating that the compression class CompressionClass of the third compressed map slice is the third compression class CompressionClass-3, and the third start logical address StartLA<3> of the fourth class entry Class Entry-4 may include start logical address included in logical-to-physical address mapping information of the third compressed map slice compressed to the third compression class CompressionClass-3. In addition, the fourth class code Class Code<4> of the fourth class entry Class Entry-4 may be information indicating that the compression class CompressionClass of the fourth compressed map slice is the fourth compression class CompressionClass-4, and the fourth start logical address StartLA<4> of the fourth class entry Class Entry-4 may include start logical address included in logical-to-physical address mapping information of the fourth compressed map slice compressed to the fourth compression class CompressionClass-4.

As an example, the compression class description table may be stored in the memory buffer 720, and may be initialized when the memory controller 1200 is power on. Also, the compression class description table may be updated when the memory controller 1200 reads a raw map slice RawMapSlice stored in the nonvolatile memory device 1100, generates a compressed map slice Comp.MapSlice by compressing the raw map slice RawMapSlice, and then stores the compressed map slice Comp.MapSlice in the memory buffer 720.

As an example, both of the first and second mapping entries Mapping Entry-1 and Mapping Entry-2 may be in a state in which they are filled, five compressed map slices Comp.MapSlice of the first compression class CompressionClass-1 may be stored in the third mapping entry Mapping Entry-3, and two compressed map slices Comp.MapSlice of the first compression class CompressionClass-1 and one compressed map slice Comp.MapSlice of the fourth compression class CompressionClass-4 may be stored in the fourth mapping entry Mapping Entry-4. Information on this may be included in the compression class description table. When the processor 710 of the memory controller 1200 reads raw a map slice RawMapSlice stored in the nonvolatile memory device 1100, generates a compressed map slice Comp.MapSlice by compressing the raw map slice RawMapSlice, and then stores the compressed map slice Comp.MapSlice in the memory buffer 720, it may be determined where the compressed map slice Comp.MapSlice is to be stored, based on the compression class description table.

As an example, when a compressed map slice Comp.MapSlice to be newly stored has the third compression class CompressionClass-3, the memory controller 1200 may store the compressed map slice Comp.MapSlice of the third compression class CompressionClass-3 in the fourth mapping entry Mapping Entry-4, based on the compression class description table, and update the result in the compression class description table.

As another example, when a compressed map slice Comp.MapSlice to be newly stored has the first compression class CompressionClass-1, the memory controller 1200 may store the compressed map slice Comp.MapSlice of the first compression class CompressionClass-1 in the third mapping entry Mapping Entry-3 or the fourth mapping entry Mapping Entry-4, based on the compression class description table, and update the result in the compression class description table.

As still another example, when a compressed map slice Comp.MapSlice to be newly stored has the fourth compression class CompressionClass-4, the memory controller 1200 may delete some of the compressed map slices Comp.MapSlice, which are stored in the first to fourth mapping entries Mapping Entry-1 to Mapping Entry-4, based on the compression class description table, store the compressed map slice Comp.MapSlice of the fourth compression class CompressionClass-4 in a corresponding memory space, and then update the result in the compression class description table.

As described in the above-described example, a memory space in a mapping entry Mapping Entry, which is allocated to store a compressed map slice Comp.MapSlice, may have a size corresponding to the compression class CompressionClass of the compressed map slice Comp.MapSlice. As an example, a memory space having a size of 256 B in the mapping Entry Mapping Entry may be allocated for a compressed map slice Comp.MapSlice of the first compression class CompressionClass-1, a memory space having a size of 512 B in the mapping Entry Mapping Entry may be allocated for a compressed map slice Comp.MapSlice of the second compression class CompressionClass-2, a memory space having a size of 1 KB in the mapping Entry Mapping Entry may be allocated for a compressed map slice Comp.MapSlice of the third compression class CompressionClass-3, and a memory space having a size of 2 KB in the mapping Entry Mapping Entry may be allocated for a compressed map slice Comp.MapSlice of the fourth compression class CompressionClass-4.

Figure 8:
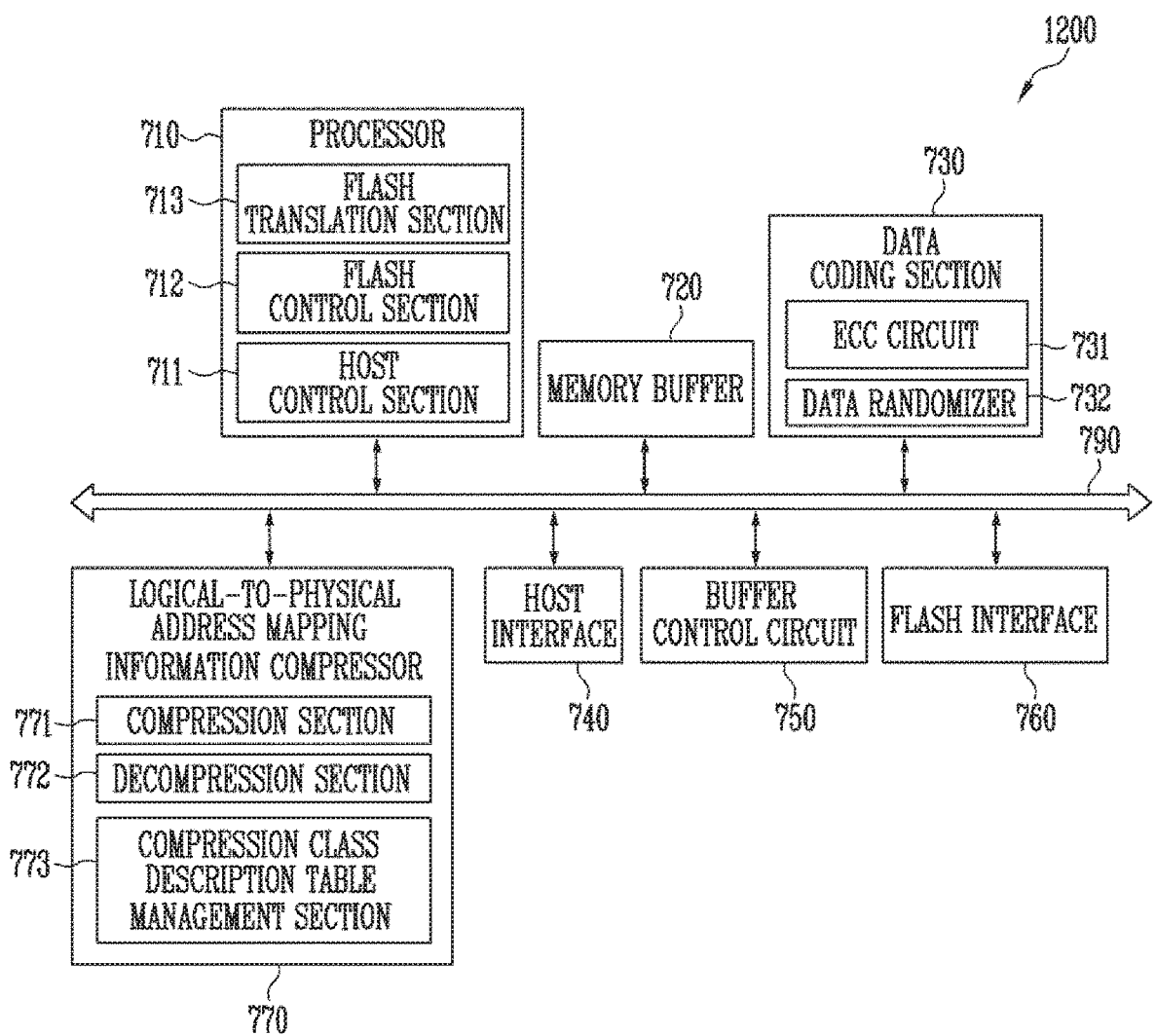
FIG. 8 is a diagram illustrating a memory controller according to another embodiment of the present disclosure.

FIG. 8 is a diagram illustrating a memory controller 1200 according to another embodiment of the present disclosure.

Referring to FIG. 8, the memory controller 1200 may further include a logical-to-physical address mapping information compressor 770, in addition to the example described in FIG. 2. In addition, the logical-to-physical address mapping information compressor 770 may include a compression section 771, a decompression section 772, and a compression class description table management section 773.

The compression section 771 may generate compressed map slices Comp.MapSlice by compressing raw map slices RawMapSlice read from the nonvolatile memory device 1100. The processor 710 of the memory controller 1200 may compress the raw map slice RawMapSlice read from the nonvolatile memory device 1100 through the compression section 771 so as to generate compressed map slices Comp.MapSlice. Data compression rates may be different depending on data configurations of the raw map slices RawMapSlice. As a result, the data sizes of the compressed map slices Comp.MapSlice may be different.

As described with reference to FIGS. 5 to 7, the compression rate may be classified and stored in the form of a plurality of compression classes in the compression class description table. The compression class description table management section 773 may perform an operation of generating compression classes CompressionClass according to data sizes of compressed map slices Comp.MapSlice and storing the compression classes CompressionClass in the compression class description table. In other words, the compression class description table management section 773 may perform an operation of generating and storing the compression class description table and updating the compression class description table.

The decompression section 772 may perform an operation of decompressing a compressed map slice Comp.MapSlice stored in the memory buffer 720. The memory controller 1200 may receive a read command and a logical address from the host 2000. The processor 710 of the memory controller 1200 may decompress the compressed map slice Comp.MapSlice stored in the memory buffer 720 through the decompression section 772 so as to check a physical address corresponding to the logical address.

The processor 710 of the memory controller 1200 may decompress the compressed map slice Comp.MapSlice stored in the memory buffer 720 through the decompression section 772 and then store the decompressed compressed map slice Comp.MapSlice in the nonvolatile memory device 1100.

Figure 9:
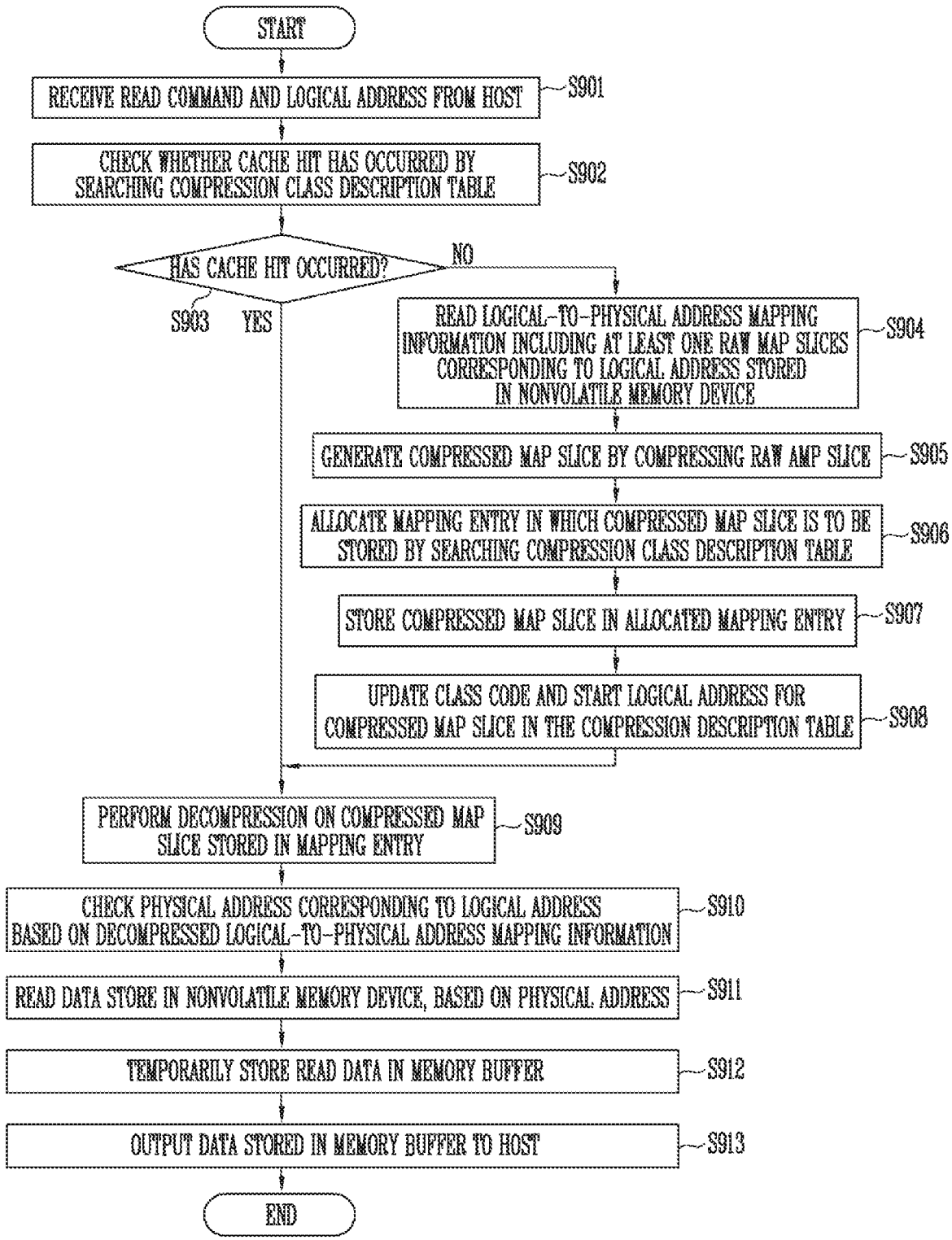
FIG. 9 is a flowchart describing a read operation according to an embodiment of the present disclosure.

FIG. 9 is a flowchart describing a read operation according to an embodiment of the present disclosure.

Referring to FIG. 9, the memory controller 1200 may receive a read command and a logical address at step S901. The processor 710 of the memory controller 1200 may check whether a cache hit has occurred by searching the compression class description table at step S902. The cache hit may mean a case where logical-to-physical address mapping information corresponding to the logical address input from the host 2000 is stored in the memory buffer 720.

If the cache hit does not occur ('NO' at step S903), the processor 710 may read from the nonvolatile memory device logical-to-physical address mapping information including at least one raw map slice RawMapSlice corresponding to the logical address provided from the host 2000 at step S904.

After the step S904, the processor 710 may generate a compressed map slice Comp.MapSlice by compressing the raw map slice RawMapSlice read from the nonvolatile memory device 1100, using the compression section 771 at step S905.

After the step S905, the processor 710 may allocate a mapping entry Mapping Entry in which the compressed map slice Comp.MapSlice is to be stored by searching the compression class description table at step S906. The step S906 may further include a step of checking available memory space of mapping entries Mapping Entry by searching the compression class description table. The available memory space of a mapping entry Mapping Entry refers to a memory space of the mapping entry Mapping Entry in which the compressed map slice Comp.MapSlice can be additionally stored.

After the step S906, the processor 710 may store the compressed map slice Comp.MapSlice in the allocated mapping entry Mapping Entry at step S907. At step S908, the processor 710 may update, in the compression class description table, a class code Class Code and a start logical address StartLA for the compressed map slice Comp.MapSlice, and an entry bit map EntryBitMap for the mapping entry Mapping Entry in which the compressed map slice Comp.MapSlice is stored.

After the step S908, the processor 710 may perform decompression on the compressed map slice Comp.MapSlice stored in the mapping entry Mapping Entry, using the decompression section 772 at step S909. Also, the processor 710 may check a physical address corresponding to the logical address provided from the host 2000, based on the logical-to-physical address mapping information included in the decompressed compressed map slice Comp.MapSlice at step S910.

After the step S910, the processor 70 may read data stored in the nonvolatile memory device 1100, based on the physical address at step S911. Also, the processor 710 may temporarily store the read data in the memory buffer 720 at step S912.

After the step S912, the processor 710 may output the read data to the host 2000 through the host interface 740 at step S913.

If the cache hit occurs ('YES' at the step S903), the step S909 may be immediately performed. In other words, the processor 710 may immediately check, in the mapping entry Mapping Entry, logical-to-physical address mapping information corresponding to the logical address received from the host 2000.

Figure 10:
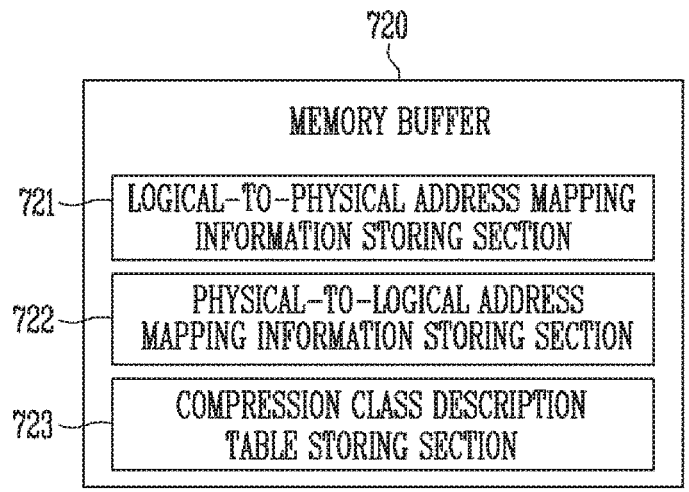
FIG. 10 is a diagram illustrating a memory buffer according to an embodiment of the present disclosure.

FIG. 10 is a diagram illustrating the memory buffer 720 according to an embodiment of the present disclosure.

Referring to FIG. 10, the memory buffer 720 may include a logical-to-physical address mapping information storing section 721, a physical-to-logical address mapping information storing section 722, and a compression class description table storing section 723.

The memory controller 1200 may receive a read command and a logical address from the host 2000. The processor 710 of the memory controller 1200 may read from the nonvolatile memory device 1100 a raw map slice RawMapSlice including logical-to-physical address mapping information corresponding to the logical address in response to the read command, generate a compressed map slice Comp.MapSlice by compressing the raw map slice RawMapSlice, and then store the compressed map slice Comp.MapSlice in the logical-to-physical address mapping information storing section 721 of the memory buffer 720. Then, the memory controller 1200 may decompress the compressed map slice Comp.MapSlice stored in the logical-to-physical address mapping information storing section 721 and check a physical address corresponding to the logical address through the decompressed compressed map slice Comp.MapSlice. Then, the memory controller 1200 may read data stored in a storage area of the nonvolatile memory device 1100, which corresponds to the physical address, and output the read data to the host 2000.

As another example, the memory controller 1200 may receive a read command and a logical address from the host 2000. The processor 710 of the memory controller 1200 may check whether logical-to-physical address mapping information corresponding to the logical address has been stored in the logical-to-physical address mapping information storing section 721 in response to the read command. If the logical-to-physical address mapping information corresponding to the logical address is stored in the logical-to-physical address mapping information storing section 721, the memory controller 1200 may decompress a corresponding compressed map slice Comp.MapSlice and check a physical address corresponding to the logical address through the decompressed compressed map slice Comp.MapSlice. Then, the memory controller 1200 may read data stored in a storage area of the nonvolatile memory device, which corresponds to the physical address, and output the read data to the host 2000.

The memory controller 1200 may receive a write command, write data, and a logical address from the host 2000. In addition, the physical-to-logical address mapping information storing section 722 of the memory controller 1200 may include information on a physical address to which the logical address is not mapped, i.e., information on a physical address corresponding to a free block or free page in the nonvolatile memory device 1100. The free block or free page may refer to a memory block 110 or page available for storing additional data. In addition, the memory controller 1200 may buffer the write data input from the host 2000 to the memory buffer 720.

In this case, the processor 710 of the memory controller 1200 may check the information on the physical address corresponding to the free block or free page of the nonvolatile memory device 1100, which is stored in the physical-to-logical address mapping information storing section 722, in response to the write command received from the host 2000, and map the physical address to the logical address. Then, the memory controller 1200 may program the write data buffered to the memory buffer 720 in a storage space of the nonvolatile memory device 1100, which corresponds to the physical address. Mapping information between the logical address and the physical address, i.e., physical-to-logical address mapping information may be temporarily stored in the physical-to-logical address mapping information storing section 722 and then flushed to the memory block 110 of the nonvolatile memory device 1100.

The processor 710 may store and manage the compression class description table described with reference to FIG. 6 in the compression class description table storing section 723. The compression class description table stored in the compression class description table storing section 723 may be initialized when the memory controller 1200 is power on.

When the processor 710 of the memory controller 1200 reads a raw map slice RawMapSlice stored in the nonvolatile memory device 1100, generates a compressed map slice Comp.MapSlice by compressing the raw map slice RawMapSlice, and then stores the compressed map slice Comp.MapSlice in the logical-to-physical address mapping information storing section 721, it may be determined where the compressed map slice Comp.MapSlice is to be stored, based on the compression class description table stored in the compression class description table storing section 723.

As an example, when a compressed map slice Comp.MapSlice to be newly stored corresponds to the third compression class CompressionClass-3, the processor 710 may store the compressed map slice Comp.MapSlice of the third compression class CompressionClass-3 in the fourth mapping entry Mapping Entry-4, based on the compression class description table stored in the compression class description table storing section 723, and update the compression class description table stored in the compression class description table storing section 723, based on the result.

Figure 11:
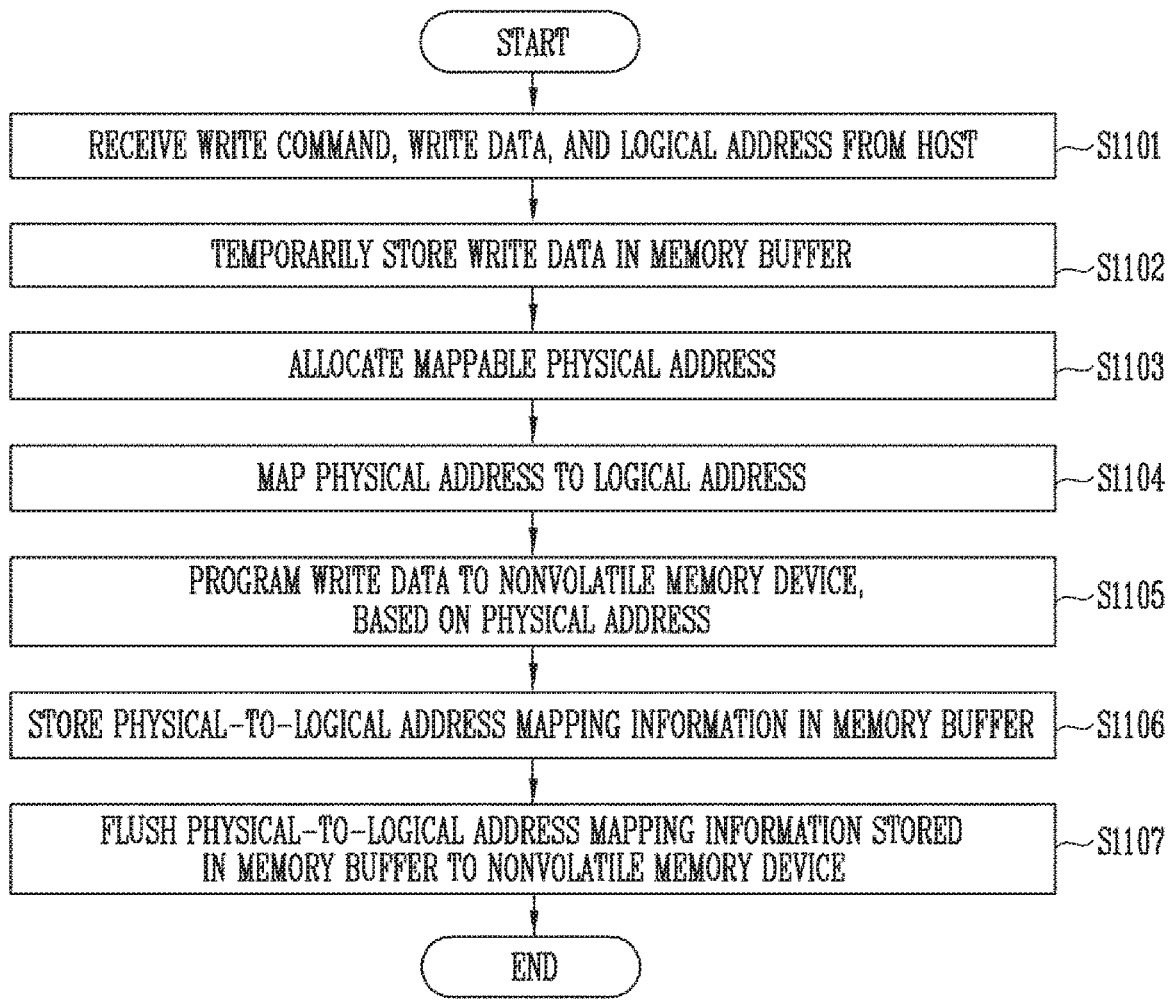
FIG. 11 is a flowchart describing a write operation according to an embodiment of the present disclosure.

FIG. 11 is a flowchart describing a write operation according to an embodiment of the present disclosure.

Referring to FIG. 11, the memory controller 1200 may receive a write command, write data, and a logical address from the host 2000 at step S1101. In addition, the processor 710 may temporarily store the write data in the memory buffer 720 at step S1102.

The processor 710 may receive a mappable physical address allocated by searching the physical-to-logical address mapping information storing section 722 at step S1103. A storage space of the nonvolatile memory device 1100, which corresponds to the mappable physical address, may be a free block or free page in which the write data can be programmed. In other words, the storage space of the nonvolatile memory device 1100, which corresponds to the mappable physical address, may be in an erase state.

Then, the processor 710 may map the allocated physical address to the logical address at step S1104.

After the step S1104, the processor 710 may program the write data temporarily stored in the memory buffer 720 to the nonvolatile memory device 1100 at step S1105. Also, the processor 710 may store mapping information between the logical address and the physical address, i.e., physical-to-logical address mapping information in the physical-to-logical address mapping information storing section 722 of the memory buffer 720, at step S1106. The step S1105 may be performed before, in parallel to, or after the step S1106. Also, during the step 1106, the processor 710 may update the existing physical-to-logical address mapping information stored in the memory buffer 720, based on the mapping information between the logical address and the physical address, i.e., the physical-to-logical address mapping information.

When a certain condition is satisfied, the processor 710 may flush the physical-to-logical address mapping information stored in the physical-to-logical address mapping information storing section 722 of the memory buffer 720 to the nonvolatile memory device 1100 at step S1107. The condition is an example, and may be used in a case where the physical address allocated to the physical-to-logical address mapping information storing section 722 becomes a certain level or lower.

The step S1107 may include an operation of updating the logical-to-physical address mapping information stored in the nonvolatile memory device 1100, based on the physical-to-logical address mapping information stored in the physical-to-logical address mapping information storing section 722 of the memory buffer 720. In other words, the logical-to-physical address mapping information and the physical-to-logical address mapping information may be separately managed in the memory buffer 720. The logical-to-physical address mapping information and the physical-to-logical address mapping information may be integrated in a single form, i.e., the form of logical-to-physical address mapping information to be managed in the nonvolatile memory device 1100.

Figure 12:
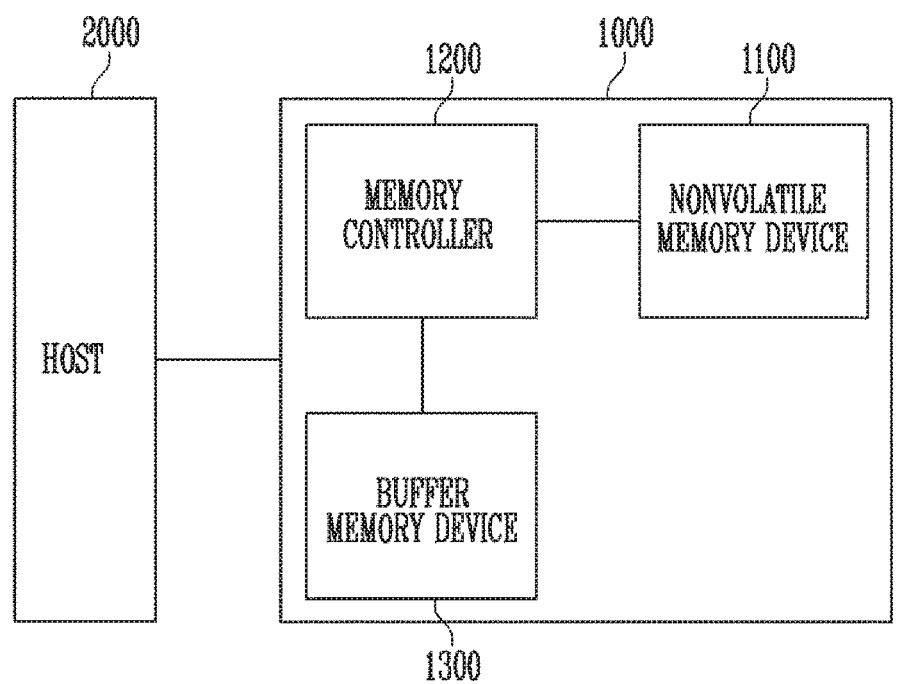
FIG. 12 is a diagram illustrating a memory system according to another embodiment of the present disclosure.

FIG. 12 is a diagram illustrating a memory system 1000 according to another embodiment of the present disclosure.

Referring to FIG. 12, the memory system 1000 may further include a buffer memory device 1300, as compared with the example described with reference to FIG. 1.

The memory controller 1200 may receive a read command and a logical address from the host 2000. The memory controller 1200 may read a raw map slice RawMapSlice including logical-to-physical address mapping information corresponding to the logical address stored in the nonvolatile memory device 1100 in response to the read command, generate a compressed map slice (Comp.MapSlice) by compressing the raw map slice (RawMapSlice), and then load the Comp.MapSlice to the buffer memory device 1300. Then, the memory controller 1200 may decompress the Comp.MapSlice loaded to the buffer memory device 1300, and check a physical address corresponding to the logical address through the decompressed Comp.MapSlice. Then, the memory controller 1200 may read data stored in a storage area of the nonvolatile memory device 1100, which corresponds to the physical address, temporarily store the data in the buffer memory device 1300, and output the data to the host 2000.

As another example, the memory controller 1200 may receive a read command and a logical address from the host 2000. The memory controller 1200 may check whether logical-to-physical address mapping information corresponding to the logical address has been stored in the buffer memory device 1300 in response to the read command. If the logical-to-physical address mapping information corresponding to the logical address is stored in the buffer memory device 1300, the memory controller 1200 may decompress a corresponding Comp.MapSlice, and check a physical address corresponding to the logical address through the decompressed Comp.MapSlice. Then, the memory controller 1200 may read data stored in a storage area of the nonvolatile memory device 1100, which corresponds to the physical address, and output the read data to the host 2000.

The memory controller 1200 may receive a write command, write data, and a logical address from the host 2000. In addition, the buffer memory device 1300 may include information on a physical address to which the logical address is not mapped, i.e., information on a physical address corresponding to a free block or free page in the nonvolatile memory device 1100. The free block or free page may refer to a memory block 110 or page in which new data is to be written. In addition, the memory controller 1200 may buffer the write data input from the host 2000 to the buffer memory device 1300.

In this case, the memory controller 1200 may check information on physical address corresponding to the free block or free page of the nonvolatile memory device 1100, which is stored in the buffer memory device 1300, in response to the write command received from the host 2000, and map the physical address to the logical address. Then, the memory controller 1200 may program the write data buffered to the buffer memory device 1300 in a storage space of the nonvolatile memory device 1100, which corresponds to the physical address. Mapping information between the logical address and the physical address, i.e., physical-to-logical address mapping information may be temporarily stored in the buffer memory device 1300 and then flushed to the memory block 110 of the nonvolatile memory device 1100.

In some embodiments, the buffer memory device 1300 may include any of a Double Data Rate Synchronous Dynamic Random Access Memory (DDR SDRAM), a Low Power Double Data Rate 4 (LPDDR4) SDRAM, a Graphics Double Data Rate (GDDR) SDRAM, a Low Power DDR (LPDDR), a Rambus Dynamic Random Access Memory (RDRAM), and the like.

In addition, the memory buffer 720 of the memory controller 1200 and the buffer memory device 1300 may be considered and referred to together as a buffer memory.

Figure 13:
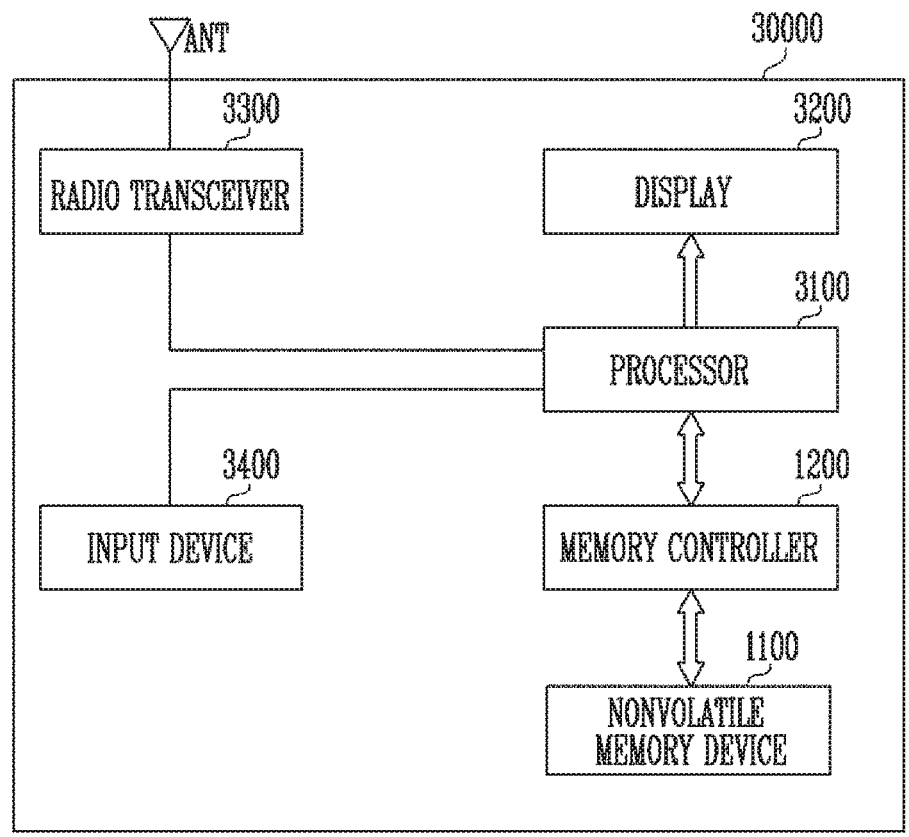
FIGS. 13 to 16 are diagrams illustrating various application examples of the memory system according to one or more embodiments of the present disclosure.

FIG. 13 is a diagram illustrating an application example of the memory system according to one or more embodiments of the present disclosure.

Referring to FIG. 13, the memory system 30000 may be implemented as a cellular phone, a smart phone, a tablet PC, a personal digital assistant (PDA), or a wireless communication device. The memory system 30000 may include a nonvolatile memory device 1100 and a memory controller 1200 capable of controlling an operation of the nonvolatile memory device 1100. The memory controller 1200 may control a data access operation of the nonvolatile memory device 1100, e.g., a program operation, an erase operation, or a read operation under the control of a processor 3100.

Data programmed in the nonvolatile memory device 1100 may be output through a display 3200 under the control of the memory controller 1200.

A radio transceiver 3300 may transmit/receive radio signals through an antenna ANT. For example, the radio transceiver 3300 may convert a radio signal received through the antenna ANT into a signal that can be processed by the processor 3100. Therefore, the processor 3100 may process a signal output from the radio transceiver 3300 and transmit the processed signal to the memory controller 1200 or the display 3200. The memory controller 1200 may program the signal processed by the processor 3100 in the nonvolatile memory device 1100. Also, the radio transceiver 3300 may convert a signal output from the processor 3100 into a radio signal, and output the converted radio signal to an external device through the antenna ANT. An input device 3400 is a device capable of inputting a control signal for controlling an operation of the processor 3100 or data to be processed by the processor 3100, and may be implemented as a pointing device such as a touch pad or a computer mount, a keypad, or a keyboard. The processor 3100 may control an operation of the display 3200 such that data output from the memory controller 1200, data output from the radio transceiver 3300, or data output from the input device 3400 can be output through the display 3200.

In some embodiments, the memory controller 1200 capable of controlling an operation of the nonvolatile memory device 1100 may be implemented as a part of the processor 3100, or be implemented as a chip separate from the processor 3100. Also, the memory controller 1200 may be implemented with the memory controller shown in FIG. 2.

Figure 14:
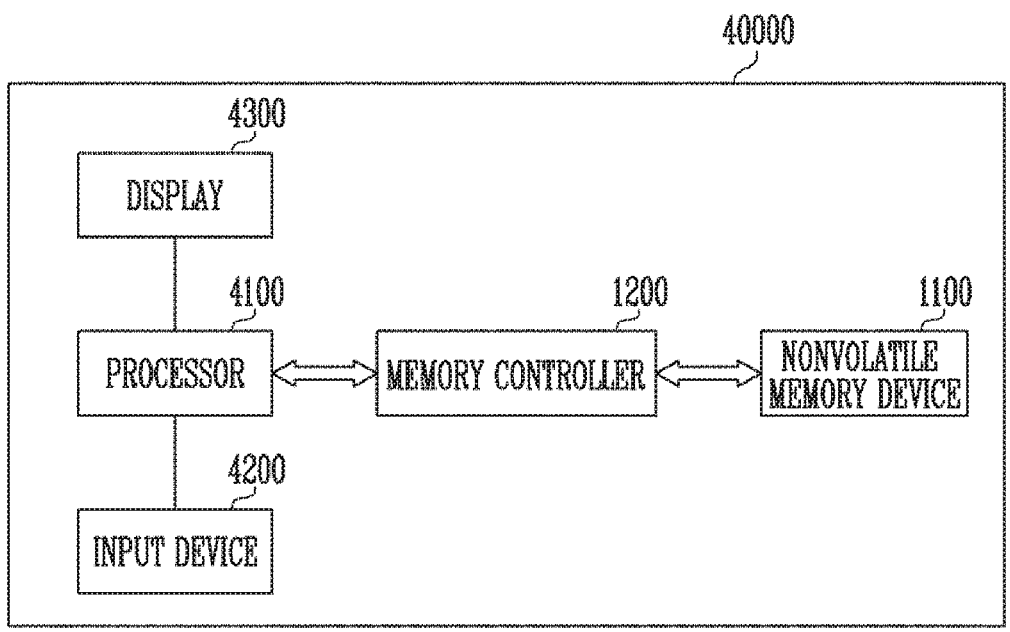

FIG. 14 is a diagram illustrating an application example of the memory system according to one or more embodiments of the present disclosure.

Referring to FIG. 14, the memory system 40000 may be implemented as a personal computer (PC), a tablet PC, a net-book, an e-reader, a personal digital assistant (PDA), a portable multimedia player (PMP), an MP3 player, or an MP4 player.

The memory system 40000 may include a nonvolatile memory device 1100 and a memory controller 1200 capable of controlling a data processing operation of the nonvolatile memory device 1100.

The processor 4100 may output data stored in the nonvolatile memory device 1100 through a display 4300 according to data input through an input device 4200. For example, the input device 4200 may be implemented as a pointing device such as a touch pad or a computer mouse, a keypad, or a keyboard.

The processor 4100 may control overall operations of the memory system 40000, and control an operation of the memory controller 1200. In some embodiments, the memory controller 1200 capable of controlling an operation of the nonvolatile memory device 1100 may be implemented as a part of the processor 4100, or be implemented as a chip separate from the processor 4100. Also, the memory controller 1200 may be implemented with the memory controller shown in FIG. 2.

Figure 15:
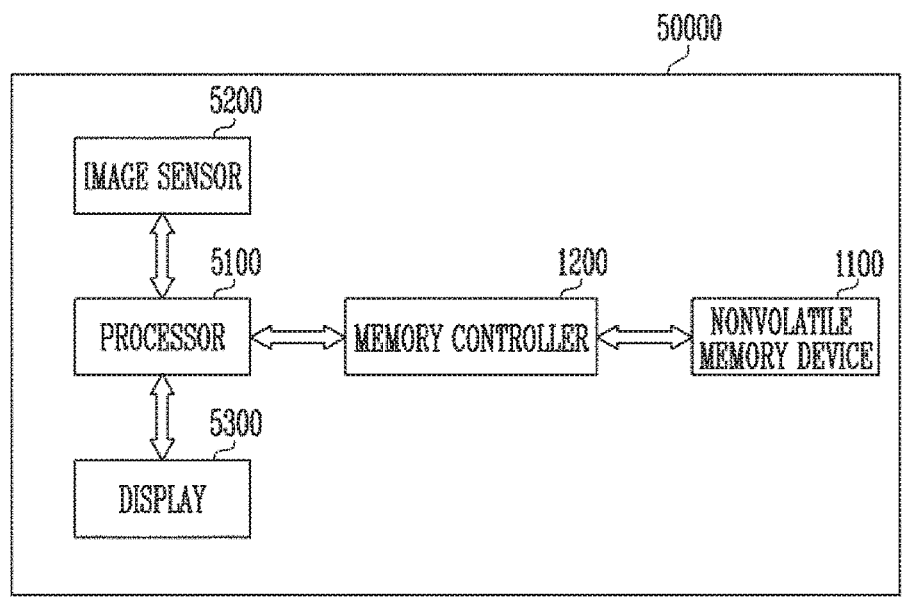

FIG. 15 is a diagram illustrating an application example of the memory system according to one or more embodiments of the present disclosure.

Referring to FIG. 15, the memory system 50000 may be implemented as an image processing device, e.g., a digital camera, or any of a variety of devices that either include or are connected to a digital camera, such as a mobile terminal, a smart phone, or a tablet PC.

The memory system 50000 may include a nonvolatile memory device 1100 and a memory controller 1200 capable of controlling a data processing operation of the nonvolatile memory device 1100, e.g., a program operation, an erase operation, or a read operation.

An image sensor 5200 of the memory system 50000 may convert an optical image into digital signals, and the converted digital signals may be transmitted to the processor 5100 or the memory controller 1200. Under the control of the processor 5100, the converted digital signals may be output through a display 5300, or be stored in the nonvolatile memory device 1100 through the memory controller 1200. In addition, data stored in the nonvolatile memory device 1100 may be output through the display 5300 under the control of the processor 5100 or the memory controller 1200.

In some embodiments, the nonvolatile memory controller 1200 capable of controlling an operation of the nonvolatile memory device 1100 may be implemented as a part of the processor 5100, or be implemented as a chip separate from the processor 5100. Also, the memory controller 1200 may be implemented with the memory controller shown in FIG. 2.

Figure 16:
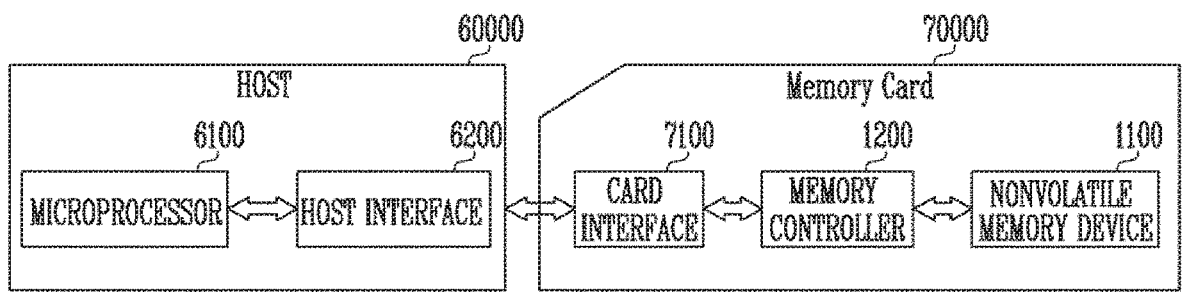

FIG. 16 is a diagram illustrating an application example of the memory system according to one or more embodiments of the present disclosure.

Referring to FIG. 16, the memory system 70000 may be implemented as a memory card or a smart card. The memory system 70000 may include a nonvolatile memory device 1100, a memory controller 1200, and a card interface 7100.

The memory controller 1200 may control data exchange between the nonvolatile memory device 1100 and the card interface 7100. In some embodiments, the card interface 7100 may be a secure digital (SD) card interface or a multi-media card (MMC) interface, but the present disclosure is not limited thereto. Also, the memory controller 1200 may be implemented with the memory controller shown in FIG. 2.

The card interface 7100 may interface data exchange between a host 60000 and the memory controller 1200 according to a protocol of the host 60000. In some embodiments, the card interface 7100 may support a universal serial bus (USB) protocol and an inter-chip (IC)-USB protocol. Here, the card interface 7100 may mean hardware capable of supporting a protocol used by the host 60000, software embedded in the hardware, or a signal transmission scheme.

When the memory system 70000 is coupled to a host interface 6200 of the host 60000 such as a PC, a tablet PC, a digital camera, a digital audio player, a cellular phone, console video game hardware, or a digital set-top box, the host interface 6200 may perform data communication with the nonvolatile memory device 1100 through the card interface 7100 and the memory controller 1200 under the control of a microprocessor 6100.

According to the present disclosure, in an operation of the memory system, the read performance of the memory system can be improved using logical-to-physical address mapping information compressed and stored in the buffer memory.

Various embodiments have been disclosed herein, and although specific terms are employed, they are used and are to be interpreted in a generic and descriptive sense and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A method for operating a memory system, the method comprising:
receiving a read command and a read logical address;
reading a raw map slice stored in a nonvolatile memory device, in a map read phase, in response to the read command, wherein the raw map slice includes a read physical address corresponding to the read logical address;
generating a compressed map slice by compressing the raw map slice;

storing a compression class corresponding to a ratio of a size of the compressed map slice to a size of the raw map slice in a compression class description table;
storing the compressed map slice in a buffer memory including a plurality of mapping entries; and
reading data corresponding to the read command from the nonvolatile memory device, in a data read phase, based on the compressed map slice stored in the buffer memory,
wherein the compression class description table includes an entry bit map including a number of compressed map slices stored in each of the plurality of mapping entries and information on an order in which the compressed map slices are stored.

2. The method of claim 1,
wherein the compressed map slice is stored by selecting one of the plurality of mapping entries based on the compression class.

3. The method of claim 2,
wherein the compression class description table includes a plurality of class entries corresponding to the plurality of mapping entries, and
wherein each of the class entries includes an entry bit map including a number of compressed map slices stored in a corresponding mapping entry, and the compression class and a start logical address for at least one compressed map slice stored in the corresponding mapping entry.

4. The method of claim 2, further comprising checking available memory space of the plurality of mapping entries by searching the compression class description table.

5. The method of claim 2,
further comprising decompressing the compressed map slice stored in the buffer memory,
wherein the data read phase is performed based on the decompressed map slice.

6. The method of claim 3,
further comprising, before the map read phase, checking whether a compressed map slice including the read physical address corresponding to the read logical address has been stored in the buffer memory by searching the compression class description table in response to the read command,
wherein the map read phase is performed when the compressed map slice including the read physical address corresponding to the read logical address is not stored in the buffer memory.

7. The method of claim 3,
wherein each of the plurality of mapping entries includes a memory space having the same size, which stores at least one compressed map slice, and
wherein the plurality of mapping entries have different numbers of compressed map slices that are to be stored according to the compression class.

8. The method of claim 7, wherein each of the plurality of mapping entries includes a static random access memory (SRAM).

9. The method of claim 2, further comprising:
receiving a write command, write data, and a write logical address;
mapping a write physical address to the write logical address based on physical-to-logical address mapping information stored in the buffer memory; and
updating the physical-to-logical address mapping information stored in the buffer memory based on the mapping.

10. The method of claim 9, further comprising:
updating at least one of the raw map slices stored in the nonvolatile memory device based on the updated physical-to-logical address mapping information; and
programming the write data to the nonvolatile memory device based on the write physical address.

11. The method of claim 10, wherein a storage space of the nonvolatile memory device, which corresponds to the write physical address, is in an erase state.

12. A memory system comprising:
a nonvolatile memory device configured to store a plurality of raw map slices including logical-to-physical address mapping information; and
a memory controller including a memory buffer and a logical-to-physical address mapping information compressor,
wherein the logical-to-physical address mapping information compressor is configured to generate compressed map slices by compressing the plurality of raw map slices read from the nonvolatile memory device, and
wherein the memory buffer is configured to store the compressed map slices and a compression class description table including information obtained by classifying compression rates of the respective compressed map slices,
wherein the memory buffer includes a plurality of mapping entries,
wherein the compression class description table includes an entry bit map including a number of compressed map slices stored in each of the plurality of mapping entries and information on an order in which the compressed map slices are stored.

13. The memory system of claim 12,
wherein the plurality of mapping entries include memory spaces having the same size to store the compressed map slices,
wherein the compression class description table includes a plurality of class entries corresponding to the mapping entries,
wherein each of the class entries includes an entry bit map including a number of compressed map slices stored in a corresponding mapping entry, and the compression class and a start logical address for at least one compressed map slice stored in the corresponding mapping entry.

14. The memory system of claim 12,
wherein the memory controller further includes a processor, and
wherein the processor is configured to check whether a compressed map slice including a read physical address corresponding to a read logical address has been stored in the memory buffer in response to a read command and the read logical address, which are input from a host.

15. The memory system of claim 14,
wherein the logical-to-physical address mapping information compressor is further configured to decompress the compressed map slices stored in the memory buffer, and
wherein the processor checks the read physical address based on the decompressed map slices.

16. The memory system of claim 14,
wherein the memory buffer is configured to store physical-to-logical address mapping information, and
wherein the processor is configured to allocate a write physical address to be mapped to a write logical address by searching for the physical-to-logical address mapping information in response to a write command and the write logical address, which are input from the host, and update the physical-to-logical address mapping information stored in the memory buffer, based on mapping information between the write logical address and the allocated write physical address.

17. The memory system of claim 16, wherein the processor updates the logical-to-physical address mapping information stored in the nonvolatile memory device based on the updated physical-to-logical address mapping information stored in the memory buffer.

18. The memory system of claim 16, wherein a storage space of the nonvolatile memory device, which corresponds to the write physical address, is in an erase state.

19. The memory system of claim 13, wherein the compression class description table is initialized when the memory controller is powered on.

20. A memory system comprising:
   a memory device configured to store pieces of logical-to-physical address mapping information; and
   a controller including a memory buffer and a logical-to-physical address mapping information compressor,
   wherein the logical-to-physical address mapping information compressor is configured to generate compressed map slices by compressing a plurality of raw map slices read from the memory device, and
   wherein the memory buffer is configured to store the compressed map slices and a compression class description table including information obtained by classifying compression rates of the respective compressed map slices,
   wherein the memory buffer includes a plurality of mapping entries,
   wherein the compression class description table includes an entry bit map including a number of compressed map slices stored in each of the plurality of mapping entries and information on an order in which the compressed map slices are stored,
   wherein the controller is configured to:
   compress, in case of a cache miss of a first logical address for a first read operation, a first piece corresponding to the first logical address among the pieces stored in the memory device and cache the compressed first piece;
   control the memory device to perform the first read operation according to a physical address mapped to the first logical address in the first piece;
   decompress, in case of a cache hit of a second logical address for a second read operation, a compressed second piece corresponding to the second logical address among one or more compressed and cached pieces; and
   control the memory device to perform the second read operation according to a physical address mapped to the second logical address in the second piece,
   wherein the controller caches the compressed piece according to an available caching size and a compression rate of the compressed piece.

* * * * *